(12) United States Patent
Ballatine et al.

(10) Patent No.: US 9,698,598 B2
(45) Date of Patent: Jul. 4, 2017

(54) ELECTRICAL VEHICLE CHARGING USING FUEL CELL SYSTEM

(75) Inventors: Arne Ballatine, Palo Alto, CA (US); Chad Pearson, Mountain View, CA (US); Ranganathan Gurunathan, Bangalore (IN); Muralidhara Ramakrishna Shyamavadhani, Bangalore (IN); Alberto Doronzo, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 789 days.

(21) Appl. No.: 13/533,216

(22) Filed: Jun. 26, 2012

(65) Prior Publication Data

US 2012/0326668 A1 Dec. 27, 2012

Related U.S. Application Data

(60) Provisional application No. 61/501,613, filed on Jun. 27, 2011.

(51) Int. Cl.
*H02J 7/00* (2006.01)
*H02J 1/10* (2006.01)
*H02J 3/38* (2006.01)
*H02J 4/00* (2006.01)
*H02J 7/34* (2006.01)
*B60L 11/18* (2006.01)
*H02J 1/00* (2006.01)

(52) U.S. Cl.
CPC ............. *H02J 1/102* (2013.01); *B60L 11/184* (2013.01); *B60L 11/1811* (2013.01); *B60L 11/1824* (2013.01); *H02J 3/381* (2013.01); *H02J 4/00* (2013.01); *H02J 7/34* (2013.01); *B60L 2230/28* (2013.01); *H02J 2001/004* (2013.01); *Y02E 60/721* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | |
|---|---|---|---|
| 5,594,318 A * | 1/1997 | Nor et al. ..................... | 320/108 |
| 7,928,693 B2 | 4/2011 | Hafner et al. | |
| 8,103,892 B2 * | 1/2012 | Krajcovic ..................... | 713/323 |
| 2003/0111842 A1 | 6/2003 | Gilbreth et al. | |
| 2006/0192435 A1 | 8/2006 | Parmley | |
| 2007/0058401 A1 * | 3/2007 | Tan et al. ....................... | 363/65 |
| 2008/0136371 A1 * | 6/2008 | Sutardja ......................... | 320/109 |
| 2009/0246596 A1 * | 10/2009 | Sridhar et al. .................. | 429/34 |
| 2009/0273240 A1 | 11/2009 | Gurunathan et al. | |

(Continued)

OTHER PUBLICATIONS

International Search Report & Written Opinion issued in PCT Application No. PCT/US2012/044195, mailed on Dec. 28, 2012.

(Continued)

*Primary Examiner* — Arun Williams
(74) *Attorney, Agent, or Firm* — The Marbury Law Group PLLC

(57) ABSTRACT

A battery charging station receives power from two or more sources and supplies power to charge batteries of electric vehicles and devices.

45 Claims, 29 Drawing Sheets

(56) References Cited

U.S. PATENT DOCUMENTS

2010/0141206 A1\* 6/2010 Agassi et al. ................. 320/109
2010/0318250 A1\* 12/2010 Mitsutani ........................ 701/22
2010/0324962 A1\* 12/2010 Nesler et al. ..................... 705/8

OTHER PUBLICATIONS

International Preliminary Report on Patentability received in connection with International Application No. PCT/US2012/044195, mailed Jan. 16, 2014.

\* cited by examiner

Installation / Load From Grid

IOM Start-up / Charge Ultracap

UPM On / Utracap On

SOFC On / Normal Operation

Customer Load Increase

Back to Normal Operation

Loss Of Grid / Ultracap Softens "Step"

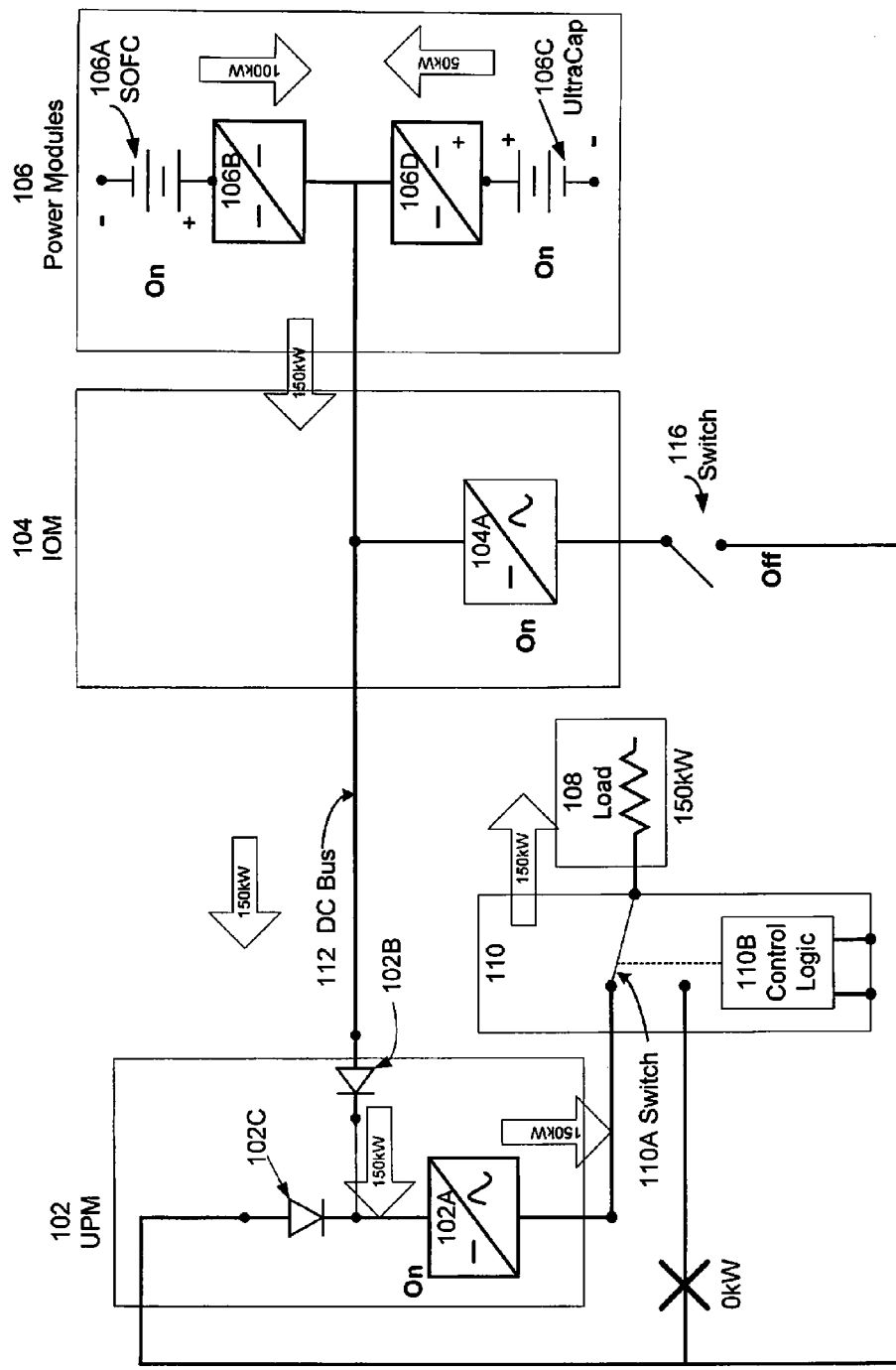
FIG. 1J Load Transient Without Grid (Part 1)

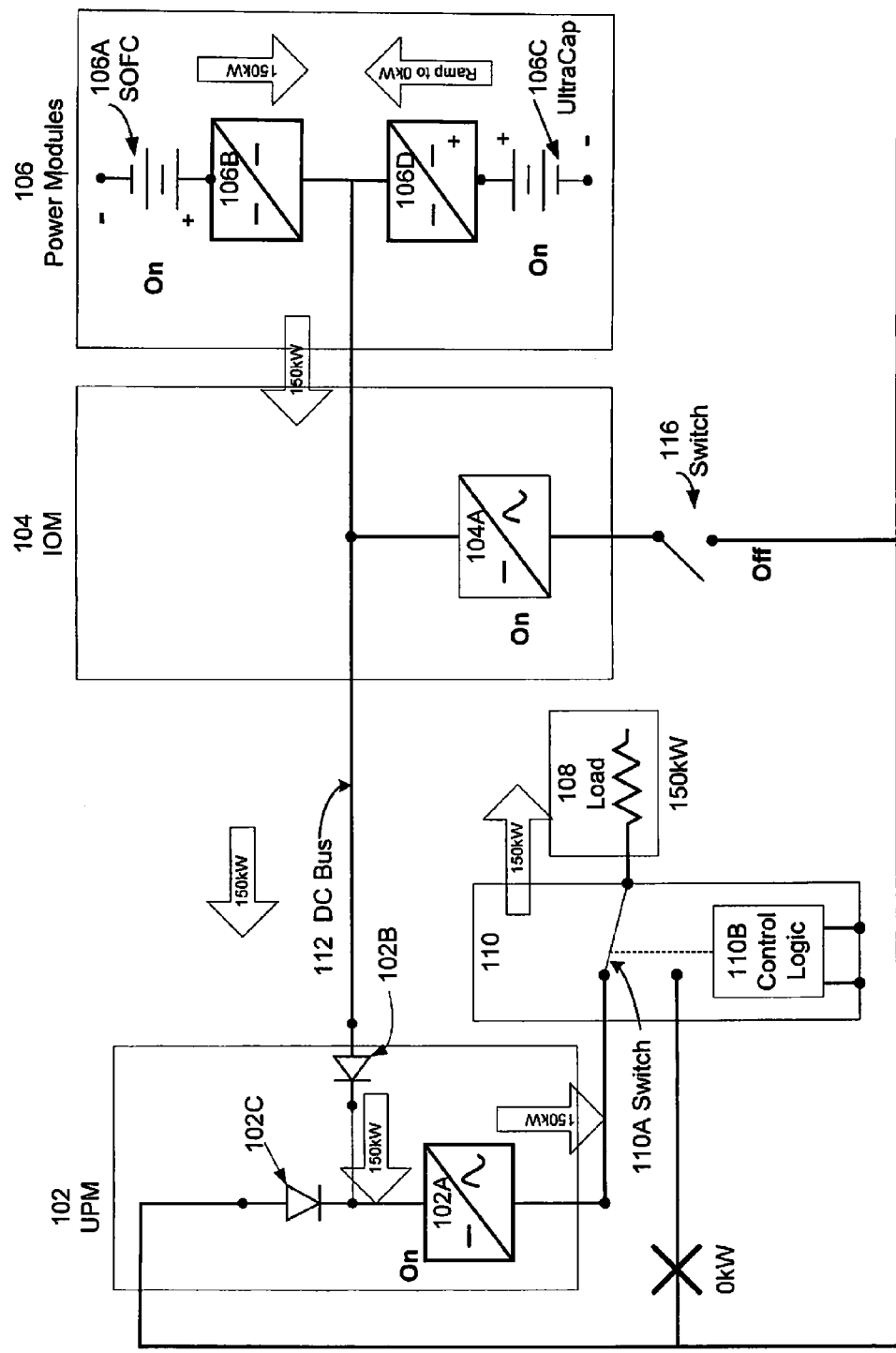
FIG. 1K Load Transient Without Grid (Part 2)

ELECTRICAL VEHICLE CHARGING USING FUEL CELL SYSTEM

This application claims priority under 35 U.S.C. §119(e) from provisional application No. 61/501,613 filed Jun. 27, 2011. The 61/501,613 provisional application is incorporated by reference herein, in its entirety, for all purposes.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their DC output into an alternating current (AC). As a result, synchronization of alternative power sources is required.

In addition, many alternative power sources use machines such as pumps and blowers which run off auxiliary power. Motors for these pumps and blowers are typically 3-phase AC motors which may require speed control. If the alternative power source generates a direct current (DC), the direct current undergoes several states of power conversion prior to delivery to the motor(s). Alternatively, the power to the motors for pumps, blowers, etc. may be provided using the electrical grid, an inverter, and a variable frequency drive. In such a configuration, two stages of power conversion of the inverter are incurred along with two additional stages of power conversion for driving components of the AC driven variable frequency drive. In general, each power conversion stage that is performed adds cost to the system, adds complexity to the system, and lowers the efficiency of the system.

Operating individual distributed generators such as fuel cell generators both with and without a grid reference and in parallel with each other without a grid reference is problematic in that switch-over from current source to voltage source must be accommodated. Additionally, parallel control of many grid independent generators can be problematic.

A combination of power systems may also be configured to supply power for charging electric vehicles.

SUMMARY

According to one embodiment, an electric vehicle battery charging system includes a plurality of electric vehicle battery charging devices and a plurality of power modules comprising at least one fuel cell segment, wherein M of the plurality of electric vehicle battery charging devices receive power from N of the plurality of power modules and wherein in at least one configuration M is not equal to N.

According to another embodiment, a method for providing power to an electric vehicle battery charging system includes the steps of supplying power from a plurality of power modules to a plurality of electric vehicle battery charging devices, wherein each of the N power modules comprise at least one fuel cell segment, wherein M of the plurality of electric vehicle battery charging devices receive power from N of the plurality of power modules, and wherein in at least one configuration M is not equal to N.

It is to be understood that both the foregoing general description and the following detailed description are exemplary and explanatory only, and are not restrictive of the invention as claimed.

DESCRIPTION OF THE DRAWINGS

FIGS. 1B to 1K illustrate the system of FIG. 1A in various modes of operation.

DETAILED DESCRIPTION

Figure 1A:
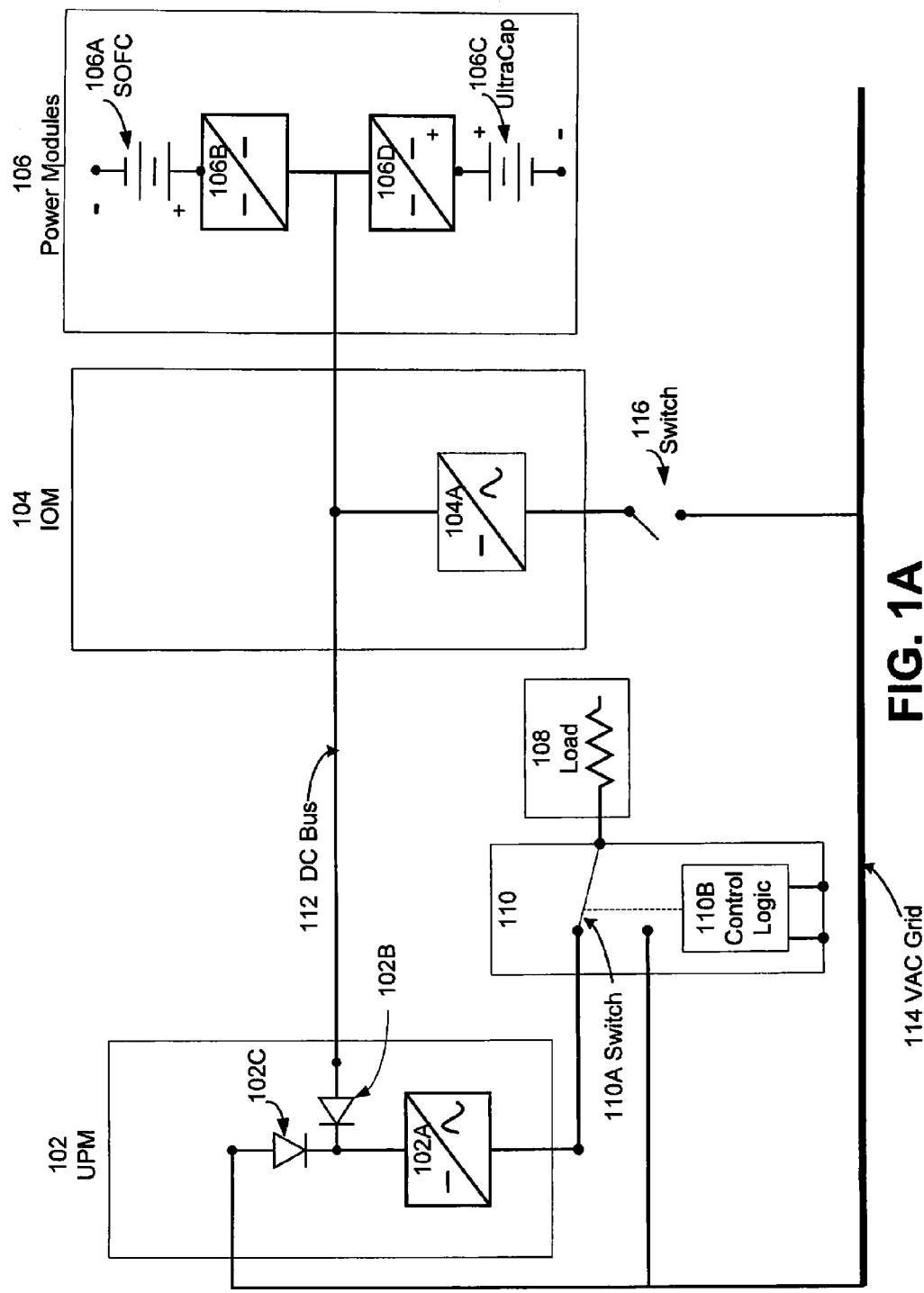
FIG. 1A is a block diagram illustrating a system according to an embodiment.

Referring to FIG. 1A, a fuel cell system according to an embodiment includes a uninterruptable power module (UPM) 102, an input/output module (IOM) 104 and one or more power modules 106 that supply power to a DC bus 112. The power module 106 comprises a first housing, the IOM 104 comprises a second housing which is separate from the first housing, and the uninterruptible power module 102 comprises a third housing which is separate from the first and the second housings. If there is more than one power module 106, for example six to ten modules 106, then each power module may comprise its own housing. Each housing may comprise a cabinet or another type of full or partial enclosure, for example the cabinet described in U.S. application Ser. No. 12/458,355, filed on Jul. 8, 2009 and incorporated herein by reference in its entirety. The modules may be arranged in one or more rows or in other configurations.

The UPM 102 includes at least one DC/AC inverter 102A. If desired, an array of inverters may be used. Any suitable inverter known in the art may be used. The UPM 102 optionally contains an input rectifier, such as an input diode 102B which connects to the DC bus 112 from the power module(s) 106 and to the input of the at least one inverter 102A. The UPM also optionally contains a boost PFC rectifier 102C which connects to the output the electric grid 114, such as a utility grid, and to the input of the at least one inverter 102A.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The voltage on DC bus 112 may be selected to efficiently supply the load 108. For example, the voltage may be +/−380 VDC or +/−400 VDC. The DC/DC converters 106B may be located in the IOM 104 instead of the power module 106.

The power module(s) 106 may also optionally include an energy storage device 106C, such as a bank of supercapacitors or batteries. Device 106C may also be connected to the DC bus 112 using one or more DC/DC converters 106D.

The UPM 102 is connected to an input/output module (IOM) 104 via the DC bus 112. The DC bus receives power from power modules 106.

The fuel cell system and the grid 114 are electrically connected to a load 108 using a control logic unit 110. The load may comprise any suitable load which uses AC power, such as one or more buildings, appliances, lights, tools, air conditioners, heating units, factory equipment and machinery, power storage units, computers, security systems, etc. The control logic unit includes a switch 110A and control logic 110B, such as a computer, a logic circuit or a dedicated controller device. The switch may be an electrical switch (e.g., a switching circuit) or an electromechanical switch, such as a relay.

Control logic 110B routes power to the load 108 either from the UPM 102 or from the grid 114 using switch 110A. The at least one fuel cell segment 106A and storage device 106C from module 106 are electrically connected in parallel to the at least one first inverter 104A in IOM and to the at least one second inverter 102A in the UPM 102. The at least one first inverter 104A is electrically connected to the load 108 through the electrical grid 114 using switch 110A in the first position. In contrast to the circuit shown in U.S. patent application Ser. No. 12/148,488 (filed May 2, 2008 and entitled "Uninterruptible Fuel Cell System"), the grid 114 in FIG. 1A is directly connected to the load 108 through the control logic unit 110 without passing through a bidirectional inverter. The at least one second inverter 102A is electrically connected to the load 108 with the switch 110A in the second position without using the electrical grid 114 (i.e., the output of the fuel cell segment 106A does not have to pass through the grid 114 to reach the load 108).

Thus, the control logic 110B selects whether to provide power to the load from the electrical grid 114 (or from the fuel cell segment 106A through the grid) or through the at least one second inverter 102A. The control logic 110B may determine a state of the power modules and select a source to power the load 108 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:

A path to the load 108 from the AC grid 114.

A path from the AC grid 114 through the IOM 104 to storage elements 106C of power modules 106 (for example, supercapacitors or batteries).

A path from the storage elements 106C of the power modules 106, over the DC bus 112 to the IOM 104 and the UPM 102 in parallel. The DC bus delivers DC to the inverter in the UPM 102. The inverter 102A in the UPM 102 or inverter 104A in IOM 104 delivers AC power to the load 108 depending on the position of the switch 110A.

A path from the power modules 106 (which may include power from the fuel cell segment(s) 106A and/or the storage elements 106C of the power modules 106), over the DC bus 112 to the IOM 104 and the UPM 102. The DC bus delivers DC voltage to the inverter in the UPM 102. The inverter 102A in the UPM 102 delivers AC power to the load 108. Power in excess of the power required by the load 108 is delivered to the AC grid through an inverter 104A in the IOM 104. The amount of power that is delivered to the AC grid 114 will vary according the demands of the load 108. If the amount of power required by the load 108 exceeds the power provided by the power modules 106, the additional power demand may be supplied by the AC grid 114 directly to the load 108 through switch 110A in the first position or to the UPM 102 with the switch 110A in the second position. The grid power is rectified in rectifier 102C in UPM 102 and provided to the inverter 102A in the UPM 102 and converted back to AC for powering the load 108.

FIGS. 1B-1K illustrate various modes of operation of the system shown in FIG. 1A. While the embodiments described below illustrate a load 108 which requires 100 kW of power and the fuel cell segment(s) 106A which output 200 kW of power in steady state, these values are provided for illustration only and any other suitable load and power output values may be used.

Figure 1B:
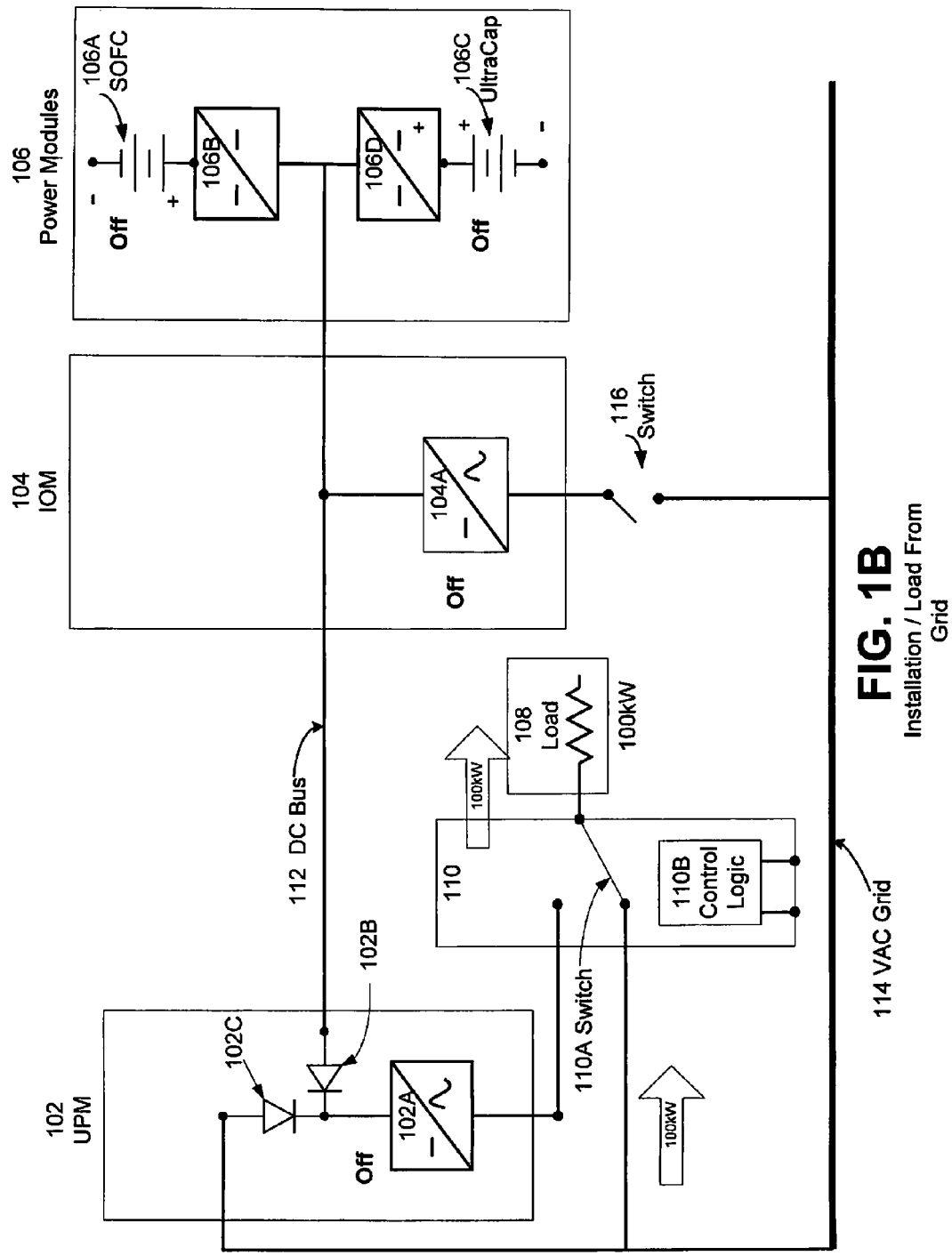

FIG. 1B illustrates the system operation during the installation of the system and/or during a period when the load 108 receives power from the grid 114. As shown in this figure, the fuel cell segment(s) 106A and the energy storage device 106C are in the OFF state, the IOM 104 inverter 104A and the UPM inverter 102A are both in the OFF state and the second switch 116 is open such that there is no electrical communication between the IOM and the grid. The control logic switch 110A is in the first position to provide power from the grid 114 to the load 108 through the control logic module 110. As shown in the figure, 100 kW of power is provided from the grid to the load through the control logic module.

Figure 1C:
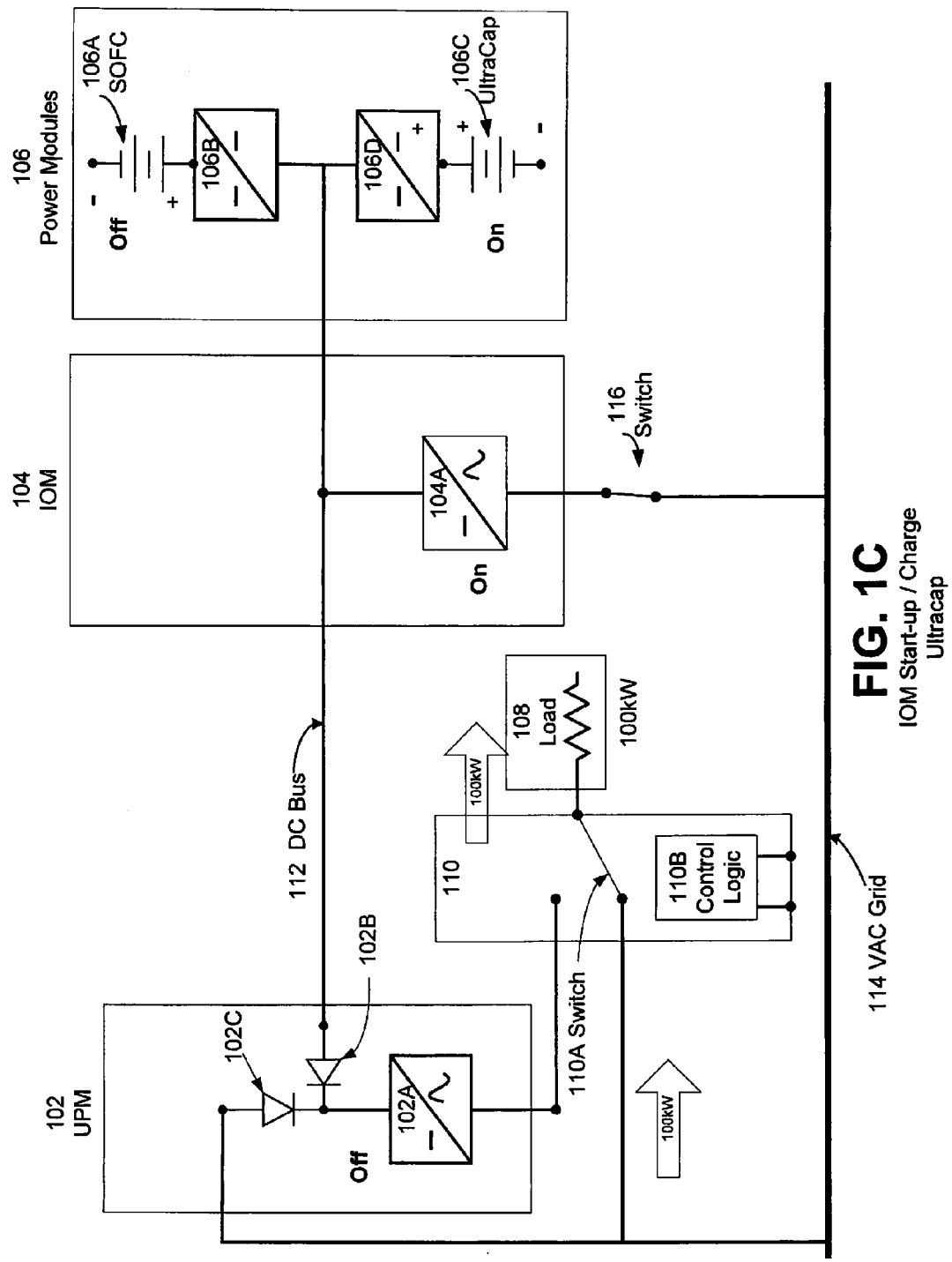

FIG. 1C illustrates the system operation during IOM start-up and charging of the energy storage device (e.g., bank of supercapacitors) 106C from the grid 114 while the load 108 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 102A is in the OFF state. The second switch 116 is closed such that there is electrical communication between the IOM and the grid to provide power from the grid 114 to the energy storage device 106C through the IOM 104 inverter 104A and the DC bus 112. The control logic switch 110A is in the first position to provide power from the grid 114 to the load 108 through the control logic module 110. As shown in the figure, 100 kW of power is provided from the grid to the load through the control logic module.

Figure 1D:
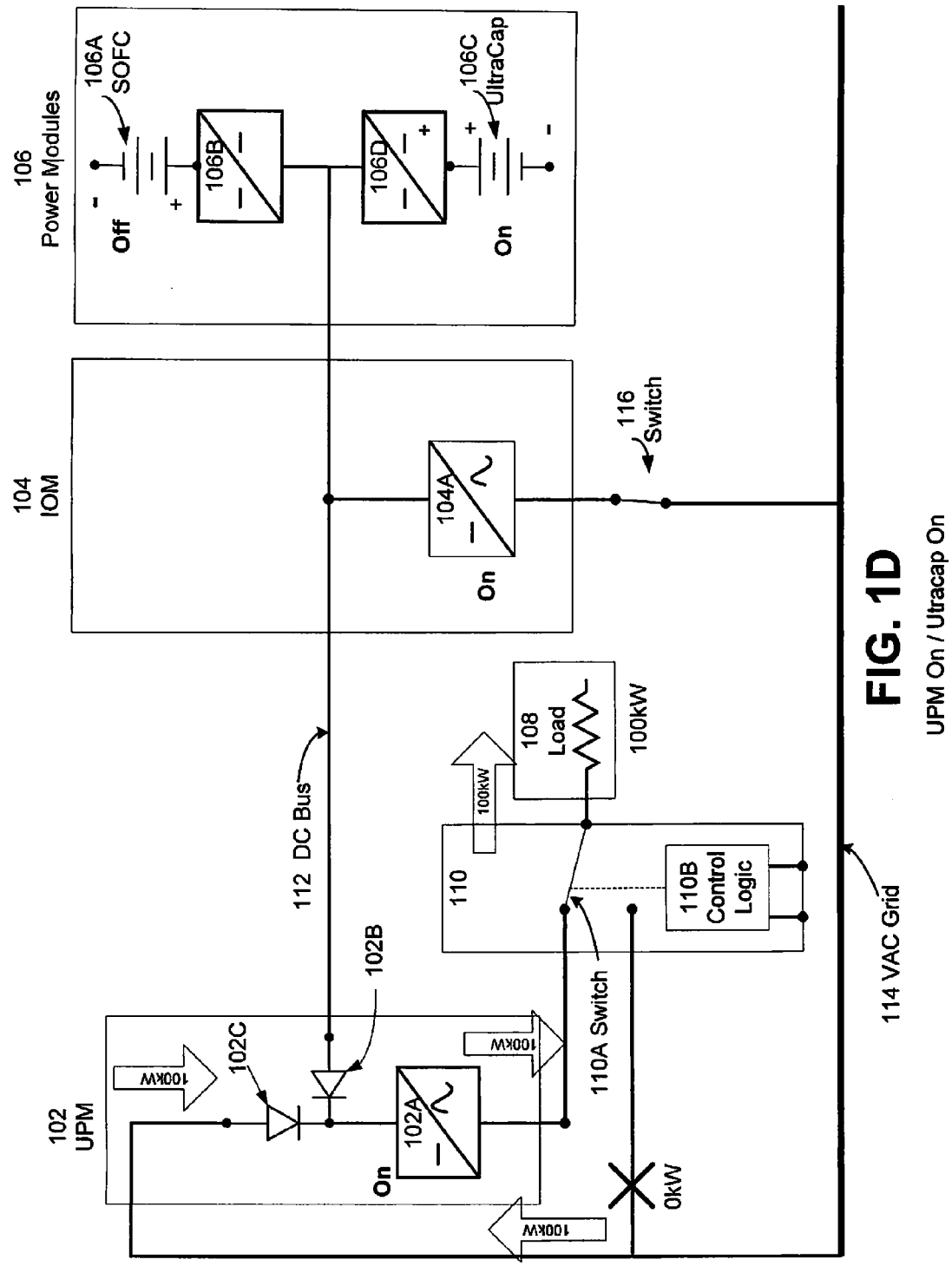

FIG. 1D illustrates the system operation during UPM start-up following IOM start-up. UPM functions by receiving power from the energy storage device 106C. UPM provides the power from the energy storage device 106C to the load 108. As shown in this figure, the fuel cell segment(s) 106A are in the OFF state while and the energy storage device 106C is in the ON state. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the UPM 102 to the load 108 through the control logic module 110. As shown in the figure, 100 kW of power is provided from the grid 114 to the load 108 through the rectifier 102C and inverter 102A of the UPM 102 and then through the control logic module. Some power may also be provided to the load 108 from the energy storage device 106C via the DC bus 112, UPM 102 and control logic module.

Figure 1E:
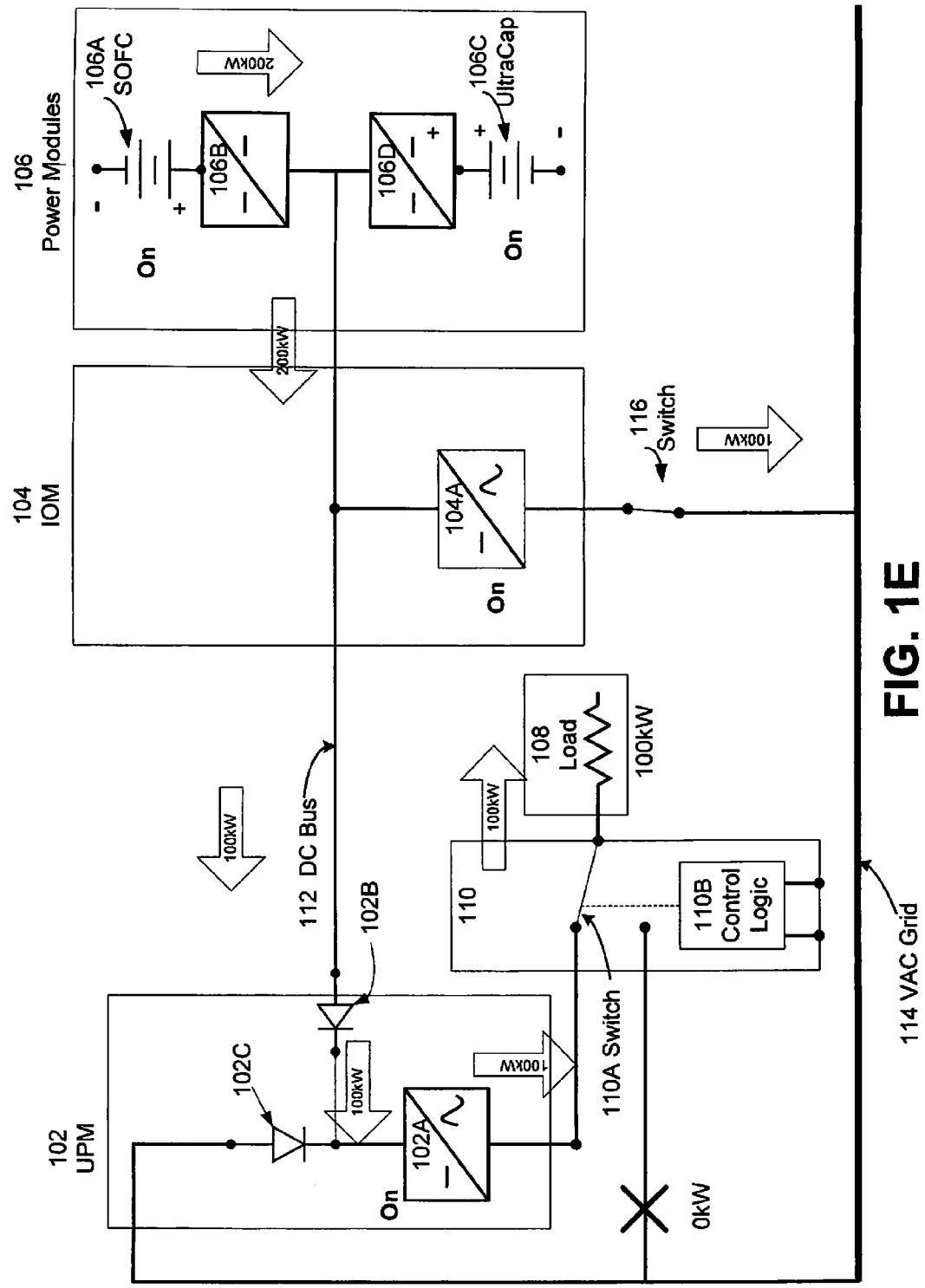

FIG. 1E illustrates the steady state operation of the system. In this mode the fuel cell segment(s) 106A is in the ON state to power the load 108. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 102A is in the ON state. The 200 kW power output is split between the grid 114 and the load 108. The second switch 116 is closed such that there is electrical communication between the IOM and the grid to provide 100 kW of power from the fuel cell segment(s) 106A to the grid. The control logic switch 110A is in the second position to provide the other 100 kW of power from the fuel cell segment(s) 106A in the power module 106 through the DC bus passing through IOM 104 and through the inverter 102A of the UPM 102 and then through the control logic module 110 to the load 108. Preferably, this 100 kW of power does not pass through the IOM inverter 104A and/or the grid 114 to reach the load 108. While a 200 kW power output split 50/50 between the grid and the load is described above, different power outputs may be used as needed, such as 25 kW to 1000 kW, which may be split 10/90 to 90/10 between the grid and the load.

Figure 1F:
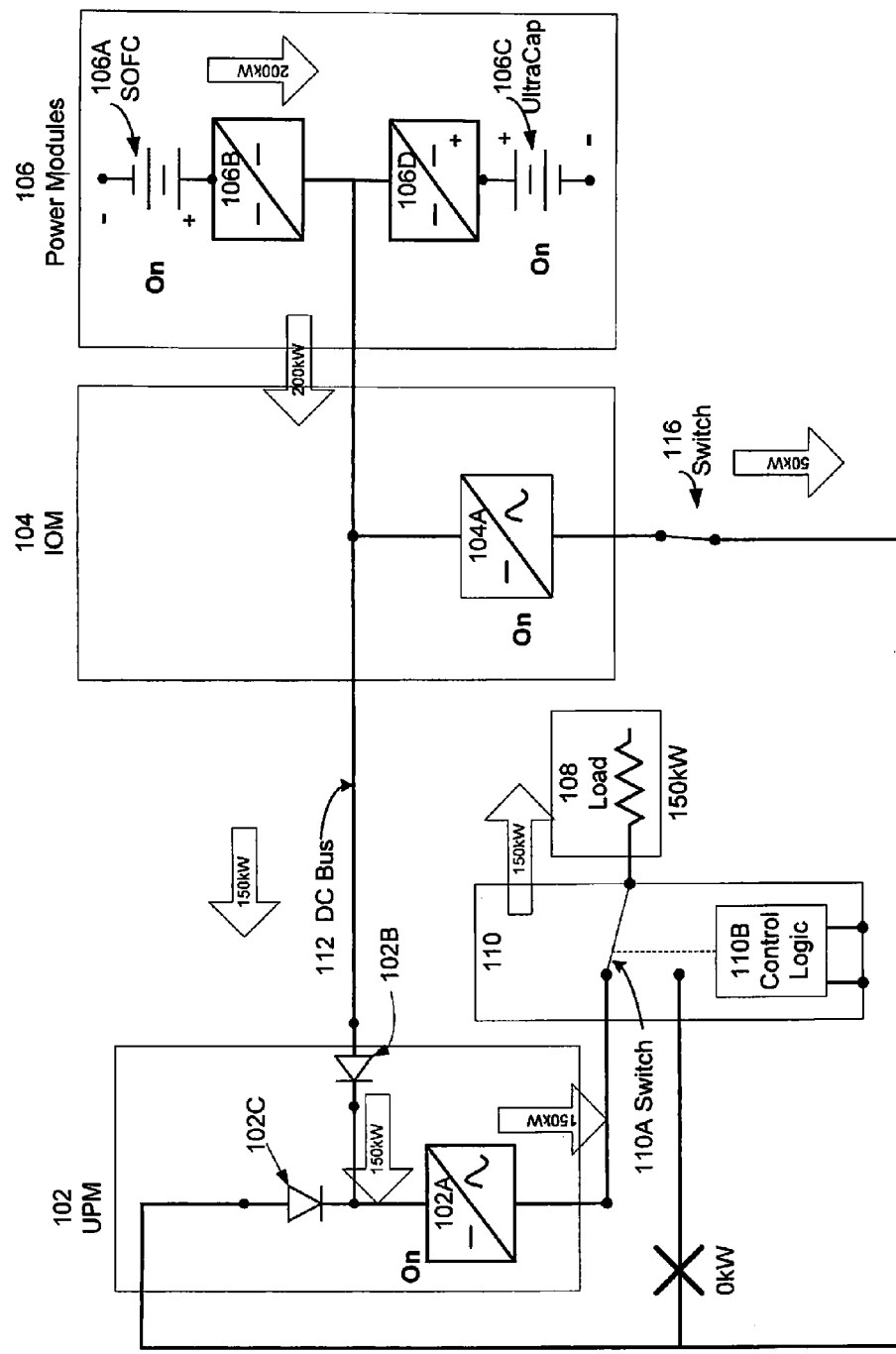

FIG. 1F illustrates operation of the system during a relatively steady load 108 increase from 100 kW to 150 kW (i.e., when the load requires more power than prior steady state operation). In this mode, more of the power output of the fuel cell segment(s) is provided to the load and less of this power output is provided to the grid than in the stead state mode described above. If desired, 100% of the power output may be provided to the load and 0% to the grid. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid to provide 50 kW of power from the fuel cell segment(s) 106A through the IOM inverter 104A to the grid 114. The control logic switch 110A is in the second position to provide 150 kW of power from the fuel cell segment(s) 106A in the power module 106 through the DC bus passing through IOM 104 and through the inverter 102A of the UPM 102 and then through the control logic module 110 to the load 108. Thus, the power output of the fuel cell segment(s) 106A is preferably split between the grid and the load in this mode. Preferably, the power does not pass through the IOM inverter 104A and/or the grid 114 to reach the load 108.

Figure 1G:
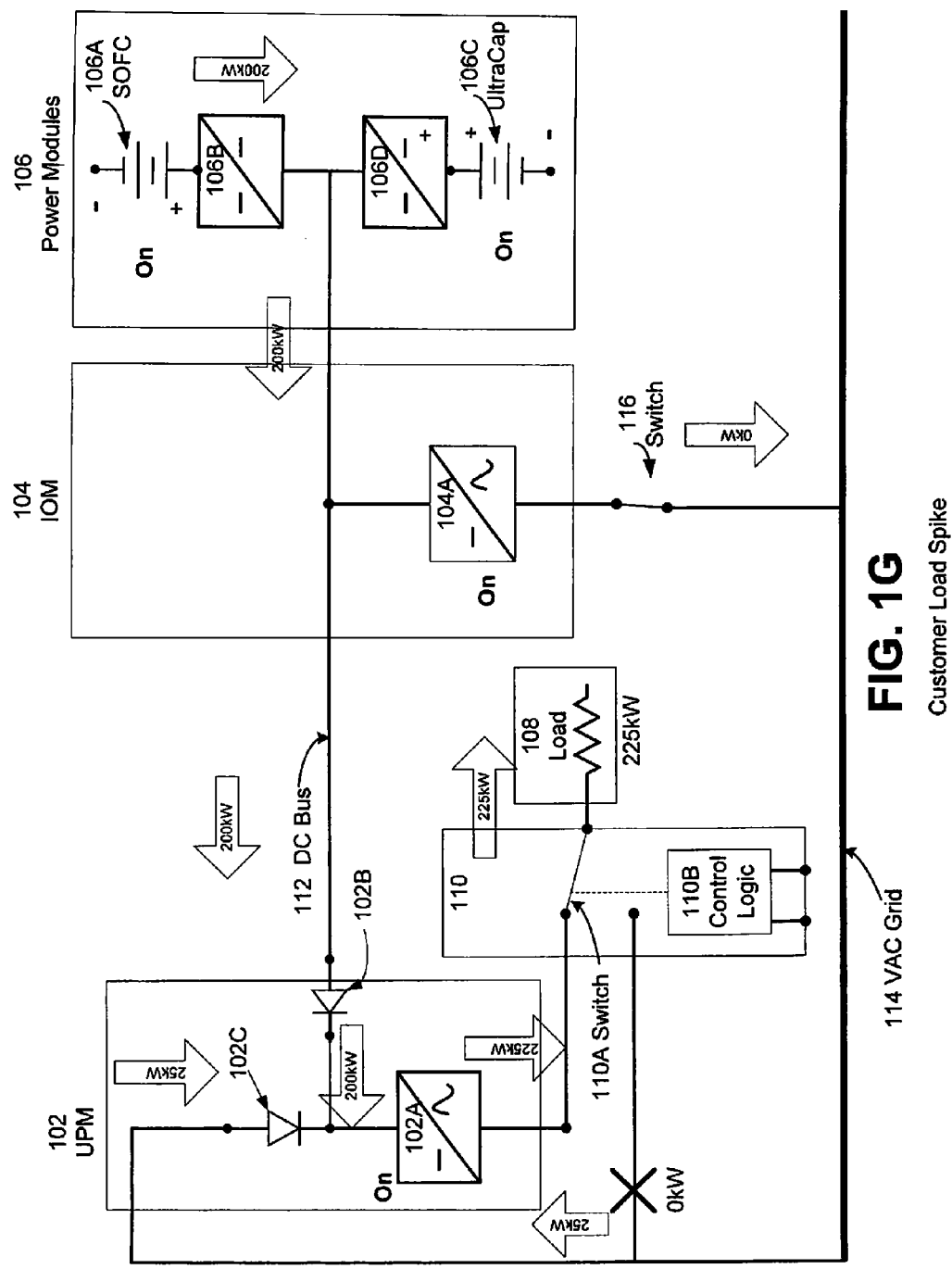

FIG. 1G illustrates operation of the system during a sudden load 108 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. However, no power is provided from fuel cell segment(s) 106A through the IOM inverter 104A to the grid 114 due to the load spike. The control logic switch 110A is in the second position to provide power from the fuel cell segment(s) 106A in the power module 106 and from the grid 114 through the DC bus passing through IOM 104 and through the inverter 102A of the UPM 102 and then through the control logic module 110 to the load 108. In this mode, the power to the load is provided from both the fuel cell segment(s) and the grid. As shown, 200 kW from the segment(s) 106A is provided through the DC bus 112, diode 102B, inverter 102A and switch 110A to the load 108, while 25 kW is provided from the grid 114 through the rectifier 102B, inverter 102A and switch 110A to the load 108 to achieve a total 225 kW of power required by the load. Preferably, the power from the fuel cell segment(s) does not pass through the IOM inverter 104A and/or the grid 114 to reach the load 108.

In the modes illustrated in FIGS. 1F and 1G, the system responds to changes in the load that fall within specified guidelines such that the there is not interruption of power to the load.

Figure 1H:
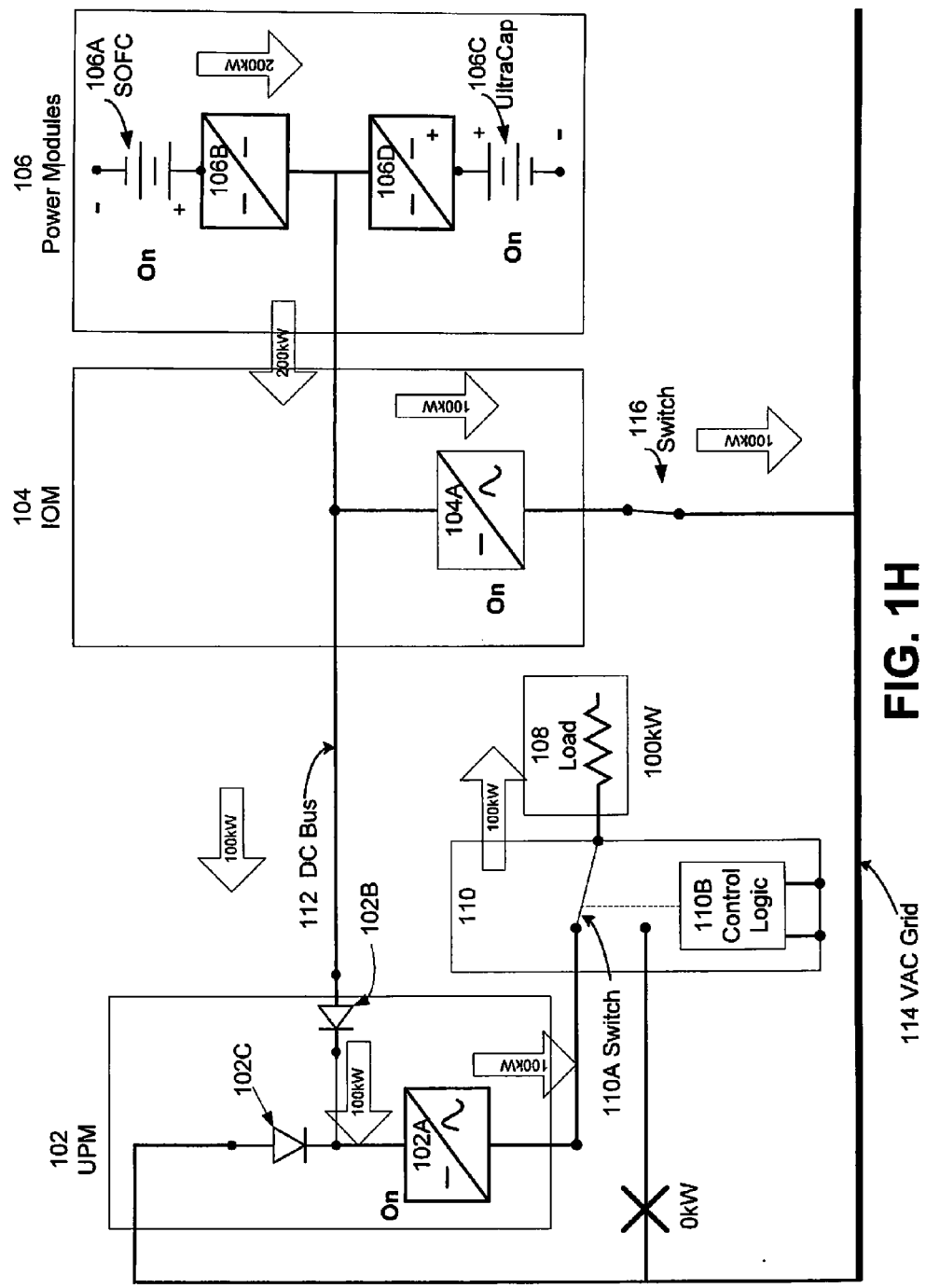

FIG. 1H illustrates operation of the system during a return to normal or steady state operation after the sudden load 108 spike. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 102B, inverter 102A and switch 110A to the load 108. Preferably, the power does not pass through the IOM inverter 104A and/or the grid 114 to reach the load 108.

Figure 1I:
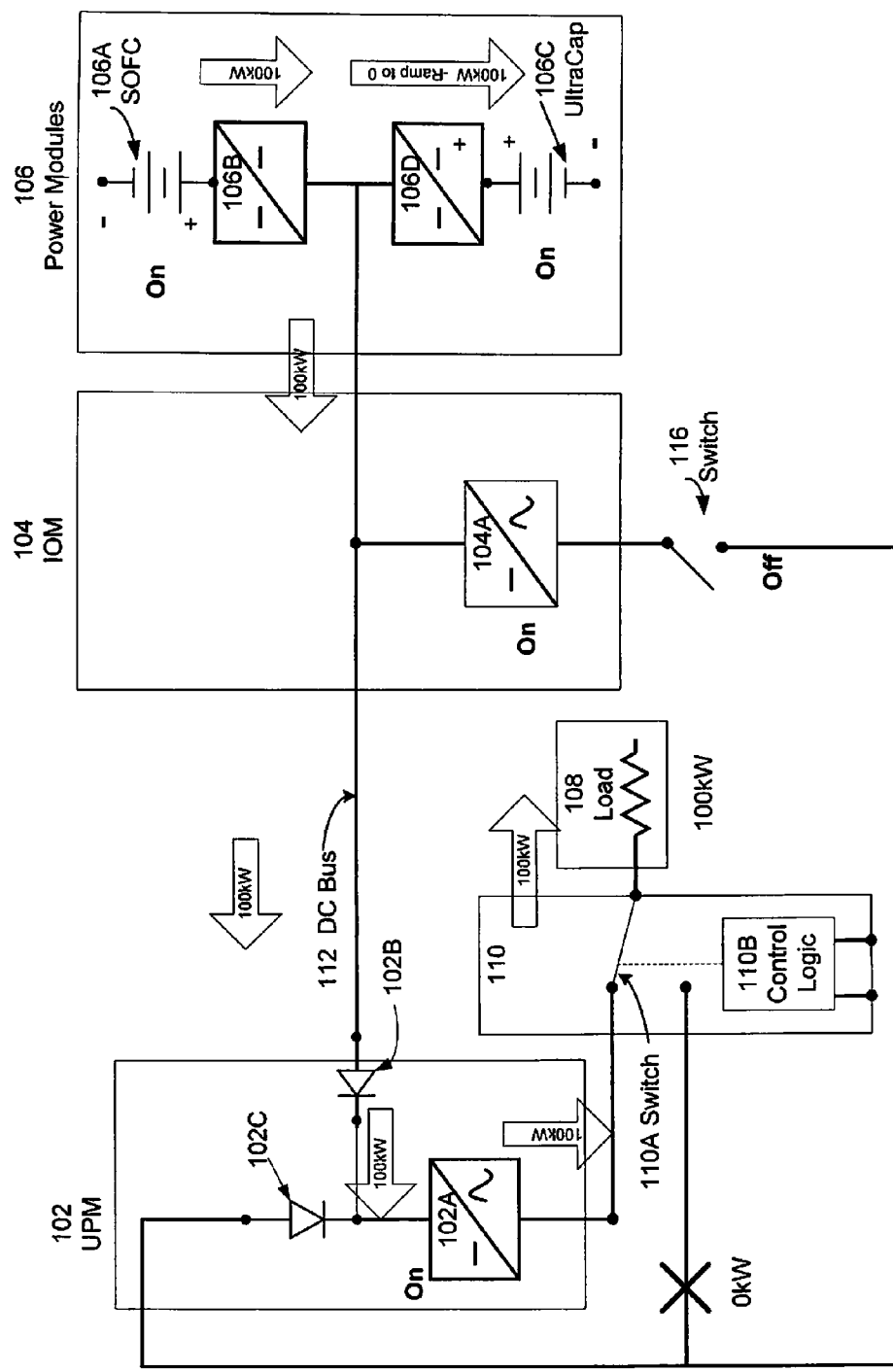

FIG. 1I illustrates operation of the system during loss of power from the grid 114 (e.g., during a black out). The fuel cell segment(s) 106A is in the ON state to power the load 108. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 102A is in the ON state. The second switch 116 is opened such that there is no electrical communication between the IOM and the grid. A sensor can sense the loss of grid power and a controller can open the switch 116 in response to the sensed grid outage. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 102B, inverter 102A and switch 110A to the load 108. The power output of the segment(s) 106A is then gradually reduced to 100 kW to meet the requirements of the load 108.

FIG. 1J illustrates operation of the system during loss of power from the grid 114 (e.g., during a black out) and in case of a load transient (e.g., increased demand for power from load 108) while the fuel cell segment(s) output a reduced amount of power (e.g., 100 kW) which meets the steady state requirements of the load. The fuel cell segment(s) 106A is in the ON state to power the load 108. As shown in this figure, the energy storage device 106C is in the ON state to provide additional power to the load 108. The IOM 104 bi-directional inverter 104A is in the ON state and the UPM inverter 102A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through IOM 104 and through the inverter 102A of the UPM 102 and then through the control logic module 110 to the load 108. In this mode, 100 kW from the segment(s) 106A and 50 kW from the energy storage device is provided to the DC bus 112. Thus, the DC bus 112 provides the 150 kW of power from IOM 104 through diode 102B, inverter 102A and switch 110A to the load 108. Preferably, the power does not pass through the IOM inverter 104A and/or the grid 114 to reach the load 108.

FIG. 1K illustrates operation of the system during loss of power from the grid 114 (e.g., during a black out) and in case of a continuing load transient (e.g., continued increased demand for power from load 108). The operation is the same as that shown in FIG. 1J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segment(s) 106A and less and less power from the energy storage device 106C until all of the required power is supplied to the load 108 by the fuel cell segment(s). Thus, the energy storage device acts as a bridging power source during the initial load transient and is then phased out during the continuing load transient.

Figure 2:
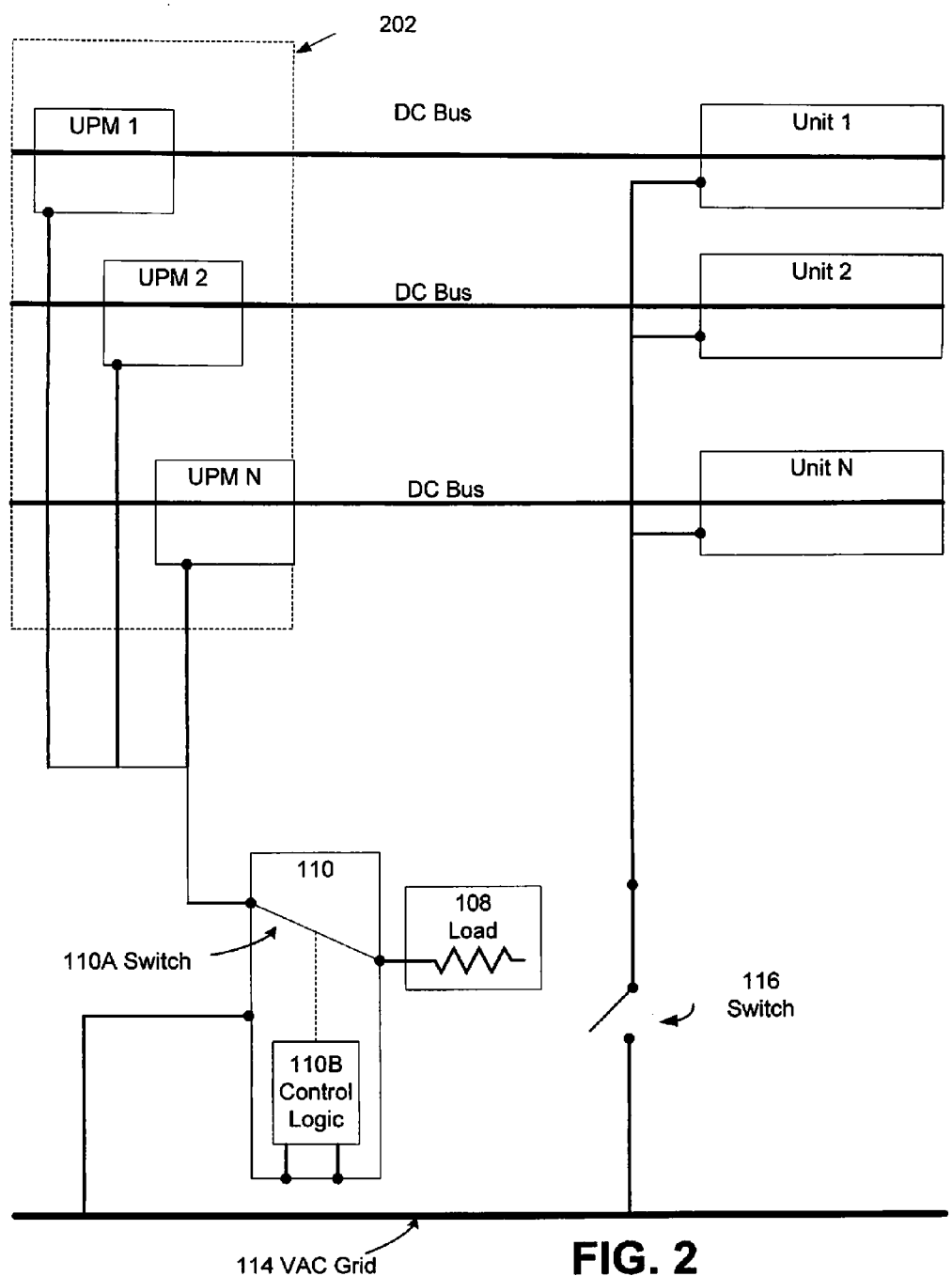
FIGS. 2 and 3 are block diagrams illustrating a system with one or more DC sources feeding a single UPM according to an embodiment.
Figure 3:
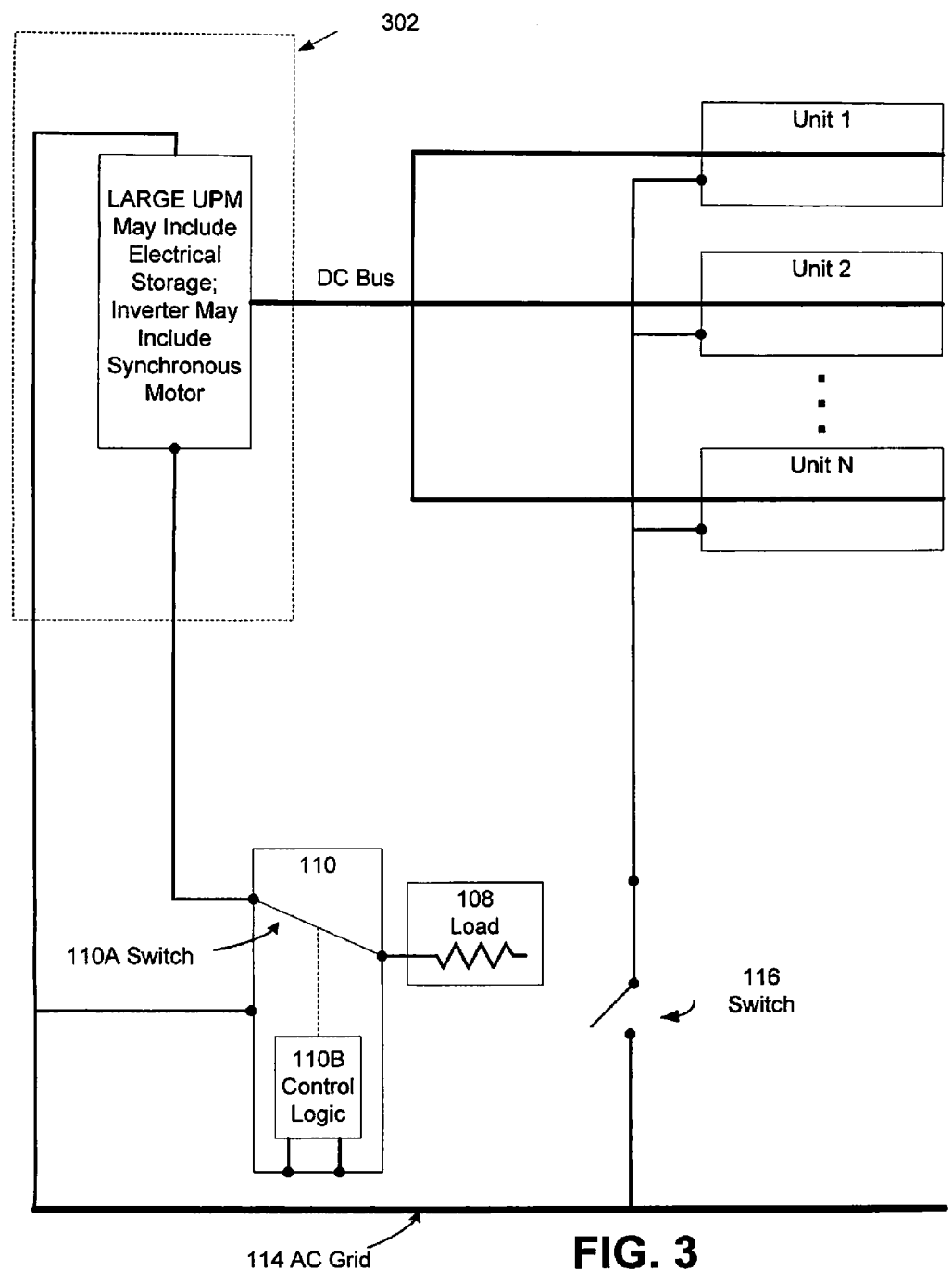

Referring to FIGS. 2 and 3, the output of the DC sources 1 to N are paralleled at the DC-output point, and a DC bus is created. Each DC source 1 to N may comprise one or more power module(s) 106 and an associated IOM 104. The 1 to N sources feed the customer load via a single UPM. Thus, the plurality of power module/IOM pairs share a common UPM. For example, the DC bus may form a DC micro grid connecting any number of DC sources (e.g., SOFC and power conditioning systems) together at one UPM. The UPM 202 may be a large assembly of individual UPM's 102 shown in FIG. 1A capable of output of many multiples of the output of the SOFC systems themselves. As illustrated, in FIG. 2, the UPM 202 comprises "N" UPMs 102 (i.e., one UPM for each DC source), with a separate DC bus connecting each DC power source to a dedicated UPM 102. The N UPM's 102 may be arranged in close proximity (e.g., side by side) in one housing or in separate housings to form the UPM assembly 202.

In an alternative embodiment shown in FIG. 3, the assembly 202 of smaller dedicated UPM's 102 may be replaced by one large UPM 302. In this embodiment, the UPM 302 may include an electrical storage device (e.g., bank of batteries or supercapacitors) and/or a synchronous motor. In general, UPM inverters may include rotating machinery (e.g., a motor, flywheel, etc.) to enhance stored energy content and/or increase reliability and inertia of output.

In summary, the DC sources may comprise fuel cell power modules and an IOM. The inverter within each UPM may be a modular assembly of smaller inverters controlled as one large inverter acting with inputs and/or outputs in parallel. An inverter within the main IOM may be a modular assembly of smaller inverters which are controlled as one large inverter acting with inputs and/or outputs in parallel.

In an embodiment, rectification is provided in the UPM to allow feed from the grid when the stacks are off-line, thus providing the load a protected bus. A boost converter may be used to maintain a good power factor to the grid.

In another embodiment, power from stored energy within an SOFC system or the UPM is used to create a "UPS" unit which has three energy inputs: grid energy; SOFC segment energy; and stored energy (e.g., ultracapacitors or batteries).

In yet another embodiment, a DC micro-grid is connected to other distributed generators such as solar power hardware or wind power hardware.

In an embodiment, the DC micro-grid is connected to DC loads such as the loads of DC data centers or DC vehicle chargers.

In yet another embodiment, when an IOM and UPM are composed of a cluster of inverters acting in parallel, some or all these inverters may be de-energized depending upon customer load conditions. For example, in a 200 kW generation capacity scenario where the customer load is 150 kW, the IOM inverters may be de-energized such that they only support 50 kW instead of a full 200 kW of grid-tied output. Further, in this scenario, it may be that only a portion of the possible inverters in the IOM assembly may be installed into the IOM, thus providing cost savings in terms of equipment required to support the specific customer load scenario.

Figure 4:
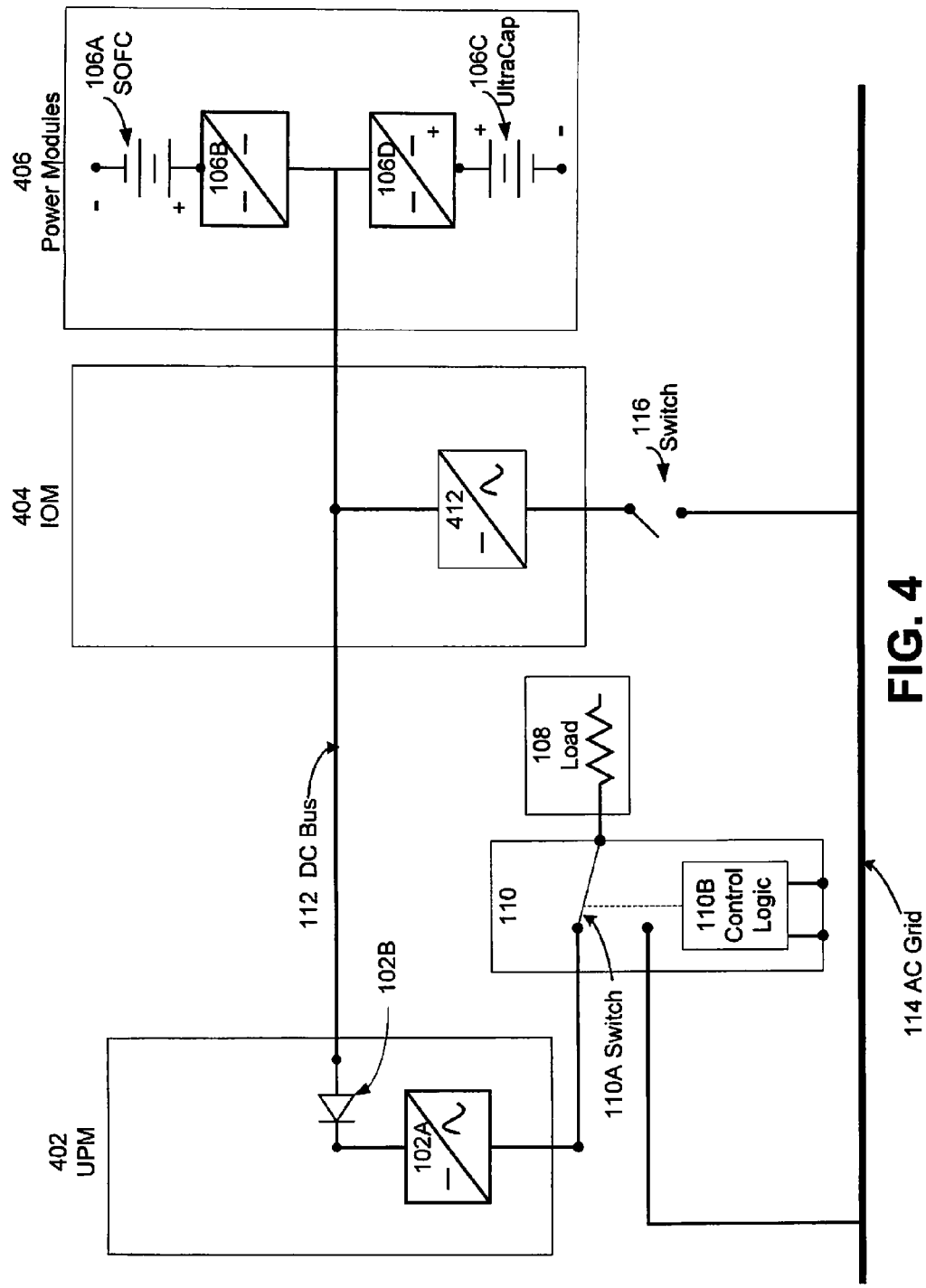
FIG. 4 is a block diagram illustrating an IOM comprising an inverter that is configured for "bi-directional" operation according to an embodiment.

Referring to FIG. 4, in an embodiment, an IOM 404 comprises an inverter 412 that is configured for "bi-directional" operation. Such an inverter may have four-quadrant operation. If the grid-tied inverter has "bi-directional" operation, then the rectified feed does not need to be supplied to the UPM 402. Grid power during start-up may come through the grid tied inverter 412 instead of via a rectified input to the UPM 402. This embodiment also provides power from power module(s) 406 for protection of the customer load.

Figure 5:
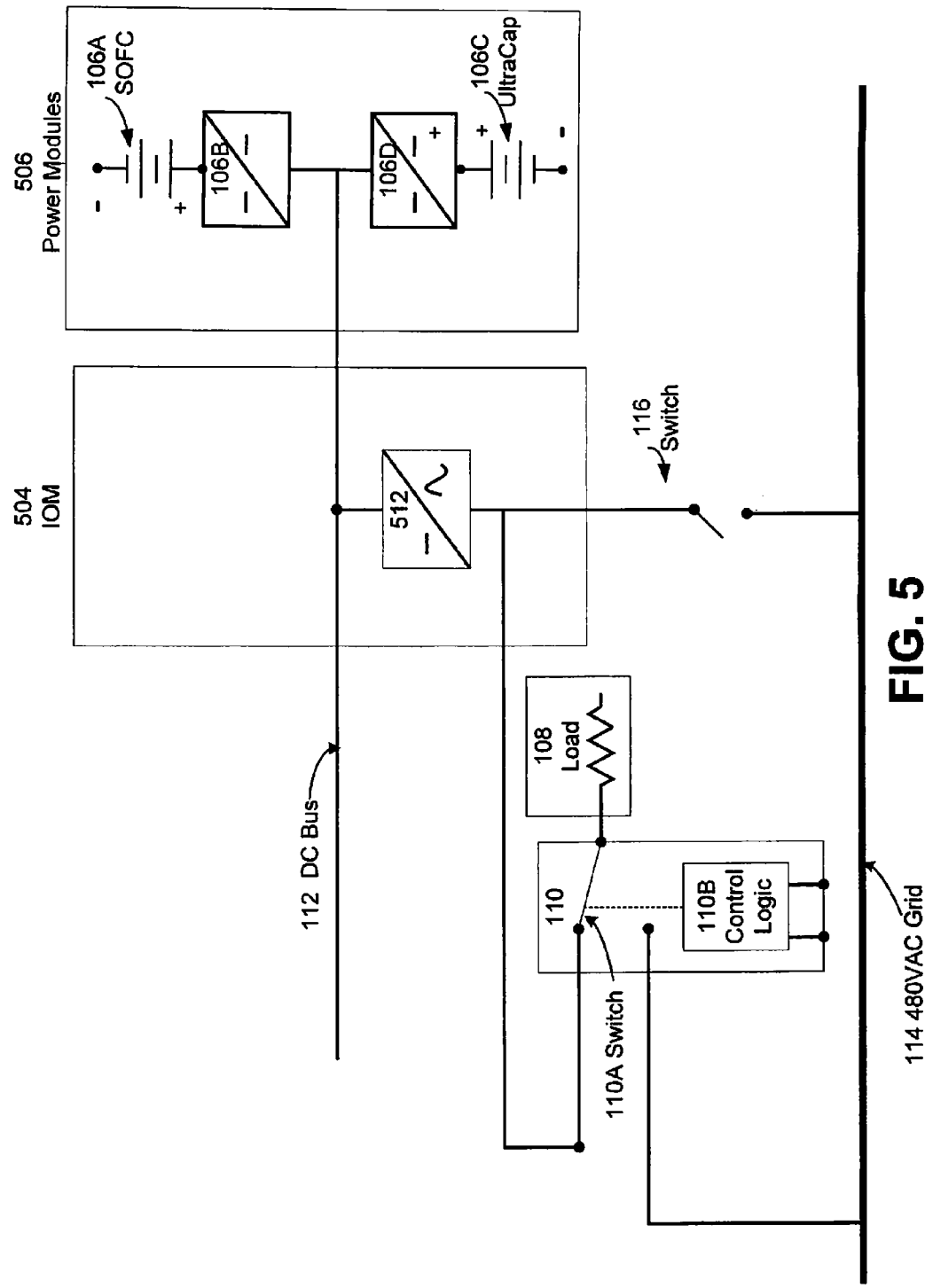
FIG. 5 is a block diagram illustrating an IOM comprising an inverter that is configured for dual mode functionality according to an embodiment.

Referring to FIG. 5, in an embodiment, a UPM is not utilized. In this embodiment, an IOM 504 comprises an inverter 512 that is configured for dual mode functionality. The dual mode inverter 512 is configured to operate with a grid reference and also in a stand-alone mode, supporting a customer load without a grid reference. In this embodiment an output power interruption would be required in order to switch between power generation in one mode and another mode.

FIGS. 6A-6D illustrate various modes of operation of the system shown in FIG. 1A. in which an electric vehicle (EV) charging module (ECM) is used instead of or in addition to the UPM 102. In some modes of operation the ECM may perform the functions of the UPM.

The systems of FIGS. 6A-6D offer several advantages when used in EV charging application. In particular, these systems remove the need for the grid to supply large peaks of power during quick charging of a large number of EVs. The systems can also be used for EV charging in areas where it would be too expensive to provide grid power, and where it would be more cost effective to lay a natural gas pipeline.

Figure 6A:
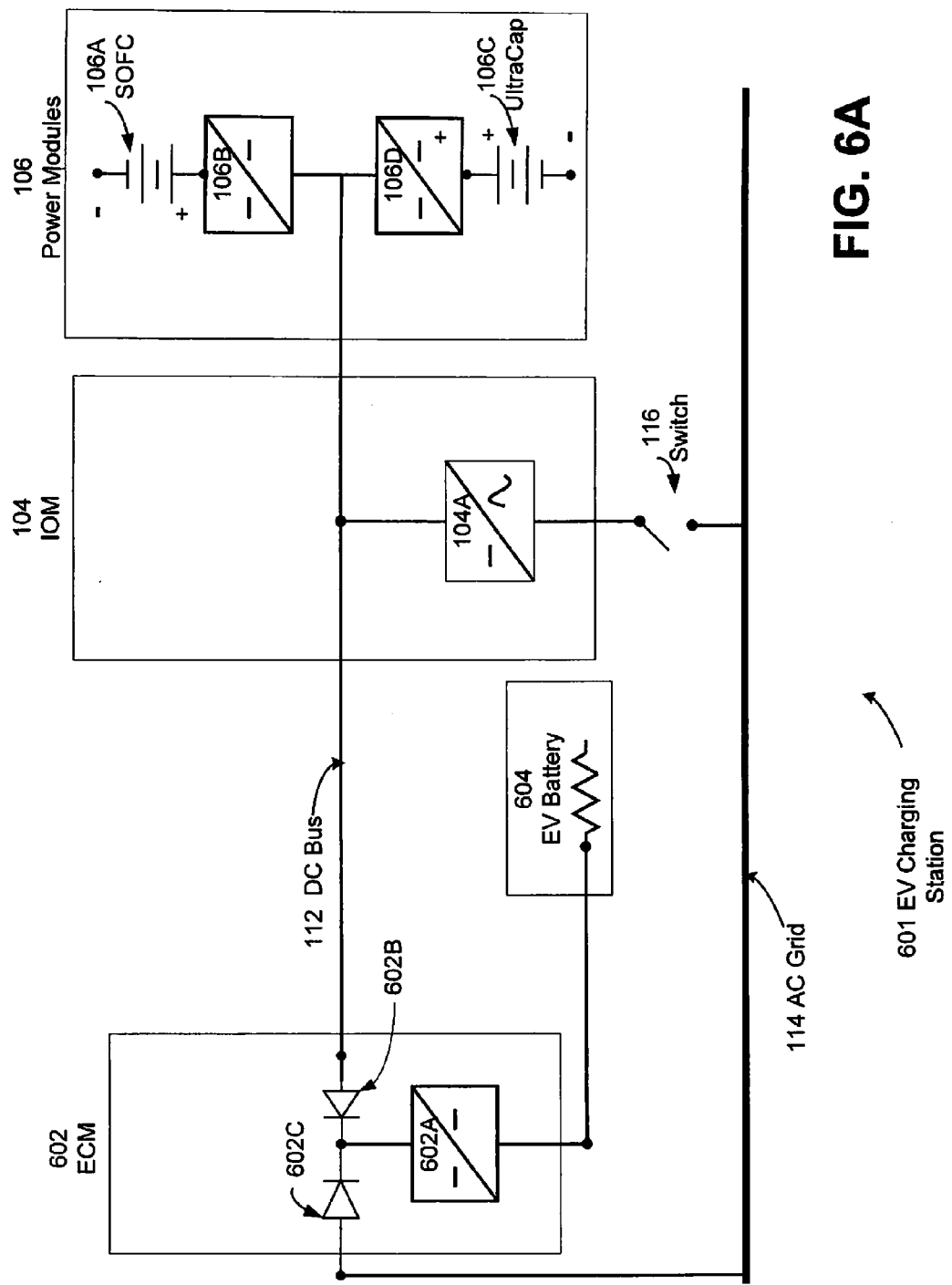
FIGS. 6A-6E illustrate various modes of operation of the system of the type shown in FIG. 1A. to provide power to an electric vehicle (EV) charging station according to embodiments.

Referring to FIG. 6A, an EV charging station 601 comprises one or more power modules 106, an IOM 104 and an ECM 602. ECM contains a DC/DC converter 602A instead of the inverter 102A of UPM 102. The ECM 602 optionally contains an input rectifier, such as an input diode 602B which connects to the output of a DC bus 112 from the power module(s) 106 and to the input of the at least one inverter 602A. The ECM 602 also optionally contains a boost PFC rectifier 602C which connects to the output the electric grid 114, such as a utility grid, and to the input of the at least one inverter 602A.

In this embodiment, the EV charging station (e.g., ECM 602) has access to grid power. The EV charging station may feed power simultaneously to the grid and the EV battery. A quick (e.g., 10-20 minute) charge may be provided from ECM 602 to the EV battery 604 using power from the FCM 106. Whenever an EV battery 604 is connected to the charging station (e.g., ECM 602) for a charge, the FCM 106 power is automatically diverted from feeding the grid into the charging station. The diversion of power from the grid to the EV battery 604 may be accomplished by the control logic as illustrated in FIG. 1A and as discussed previously. The grid power may serve as a backup power for the charging station when the power modules 106 are unavailable.

Figure 6B:
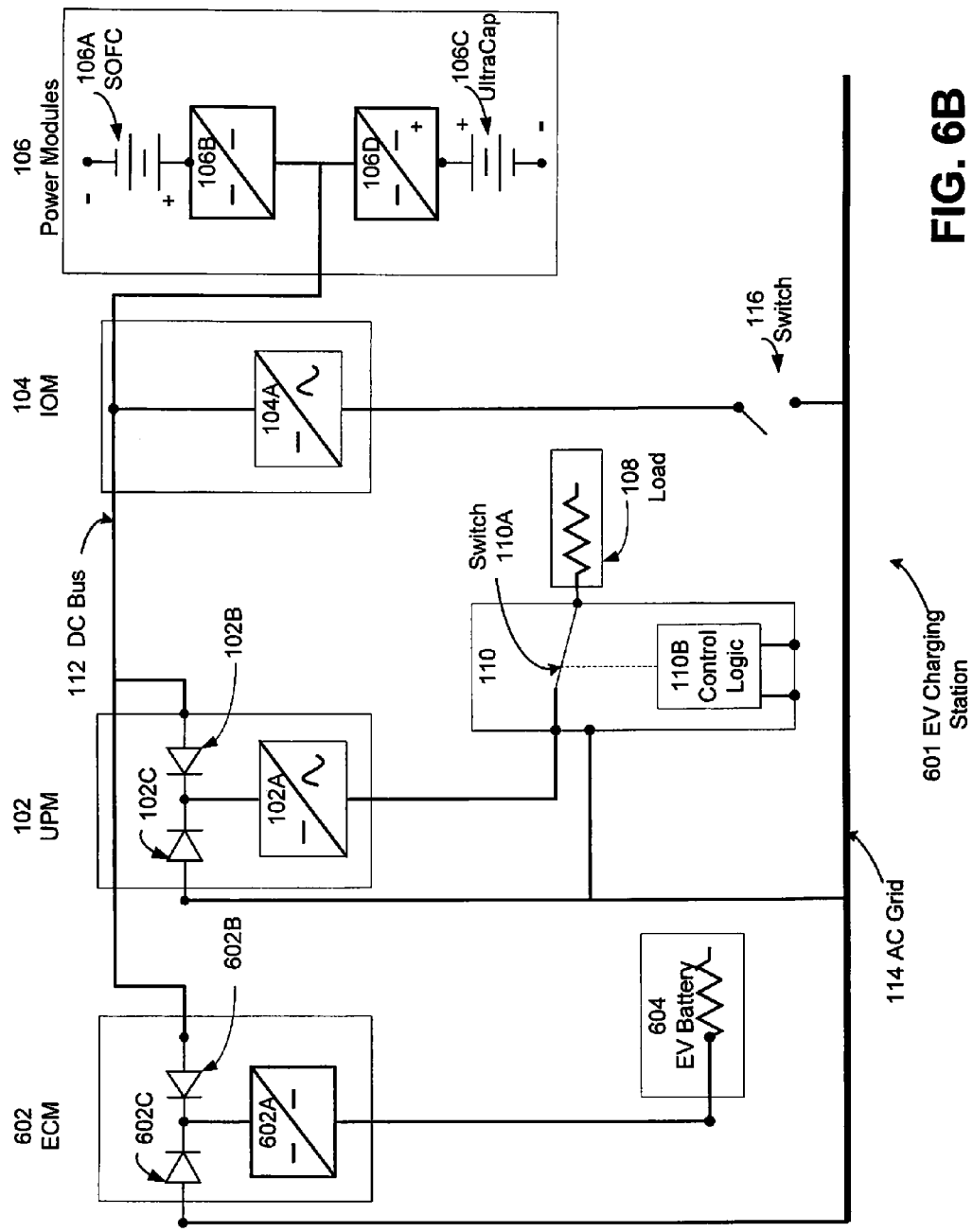

Referring to FIG. 6B, an EV charging station 601 comprises one or more power modules 106, an IOM 104, a UPM 102, control logic unit 110 and an ECM 602. In this embodiment, the EV charging station 601 may also be used to supply a customer load 108 while feeding grid power and charging an EV battery 604. In this configuration, the EV charging station 601 feeds the grid and also provides uninterrupted power to the customer load 108 (such as an office building). The IOM 104 feeds power to the grid, while the UPM 102 supplies power to the customer load 108. The ECM 602 draws power from the 400V DC bus 112. Thus, the UPM 102 and ECM 602 are connected in parallel to the DC bus 112. While the customer load 108 is supplied without interruption, anytime a vehicle drives in to get charged by the ECM 602, a portion of the power being fed to the grid is diverted to the ECM 602 for the time it takes to charge the EV battery 604. Again, this configuration overcomes the challenge of drawing high peak power from the grid, which is a major issue today especially during day time, when the grid is already supplying full capacity.

A typical application of this configuration would be to supply power to an office building. The load 108 from the building (including data centers, lighting etc) can be supplied clean uninterrupted power from the UPM 102, while power is being fed to the grid. Charging stations can be installed at the car park of this building for the employees and visitors of the company. EV batteries 604 can be charged, and then parked at the car park. Options for both quick charging (1 C) and trickle charging (0.1 C) can be provided at the charging stations, based on the time constraints of the car owner.

Figure 6C:
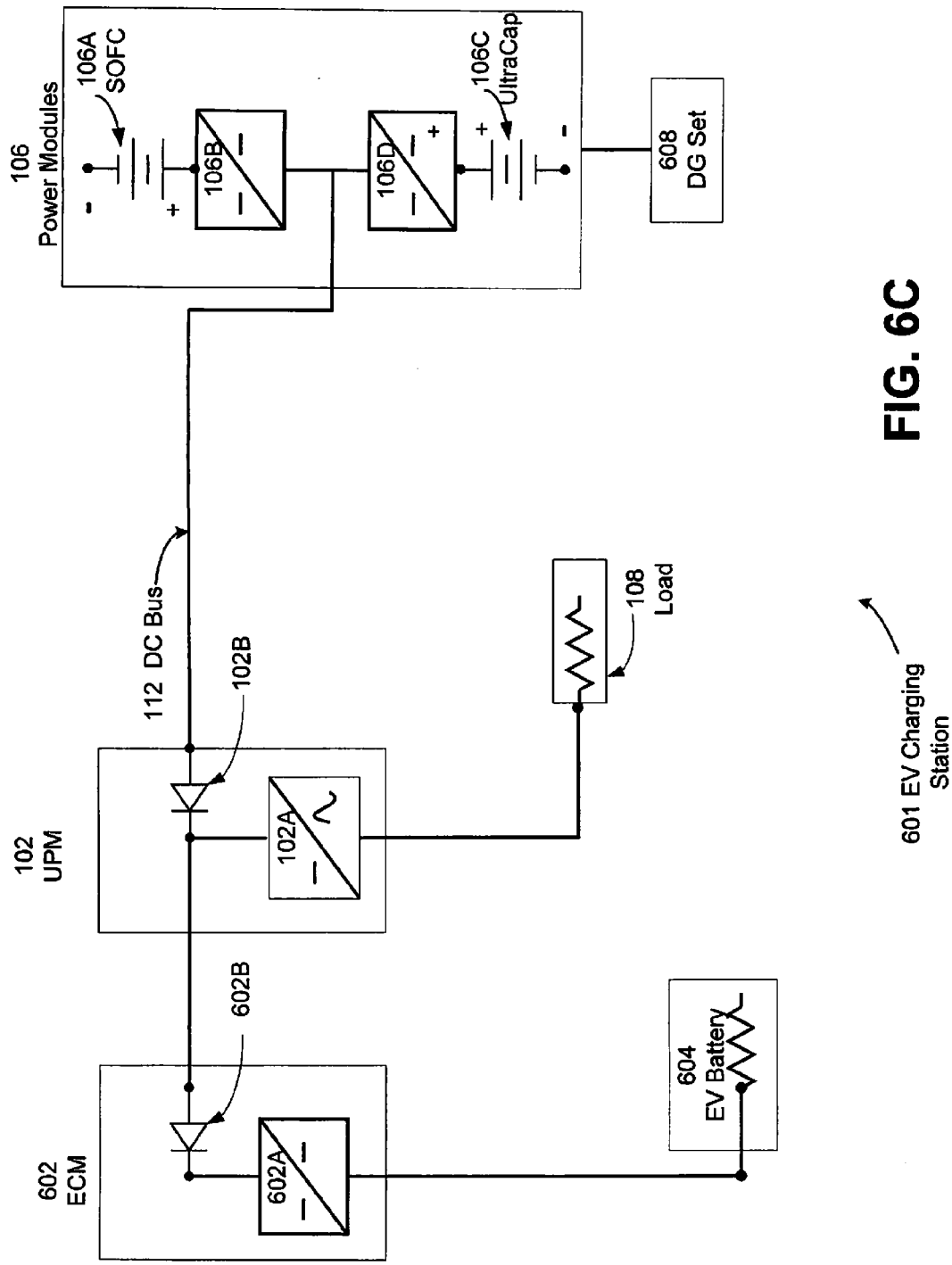

Referring to FIG. 6C, an EV charging station 601 comprises one or more power modules 106, a UPM 102, an ECM 602 and a DG set 608. This configuration is suitable for use in remote areas where grid power is not available. In this configuration, the UPM 102 draws power from the DC bus connected to the power modules 106, and feeds the customer load 108. This customer load 108 also acts like a base load to the power modules 106, which allows the system to operate at a certain minimum efficiency (in the configurations illustrated in FIGS. 6A and 6B above, the grid provides the minimum base load for efficient performance). In an embodiment, the power modules 106 and the UPM 102 are rated such that the maximum customer load is always supplied while the ECM 602 is operational. The DG set 608 is used to start up the power modules 106.

Using a fuel cell system as a source for charging EV batteries provides a dynamic and more reliable EV charging station. Additionally, the flexibility of the EV charging station architecture may expand the availability of EV charging facilities thereby increasing the likelihood that consumers and businesses will elect to own an EV. Fuel cell-based EV charging stations may also offer faster charging and possibly reduce the cost of EVs by off-loading on-board systems to the EV charging station.

Figure 6D:
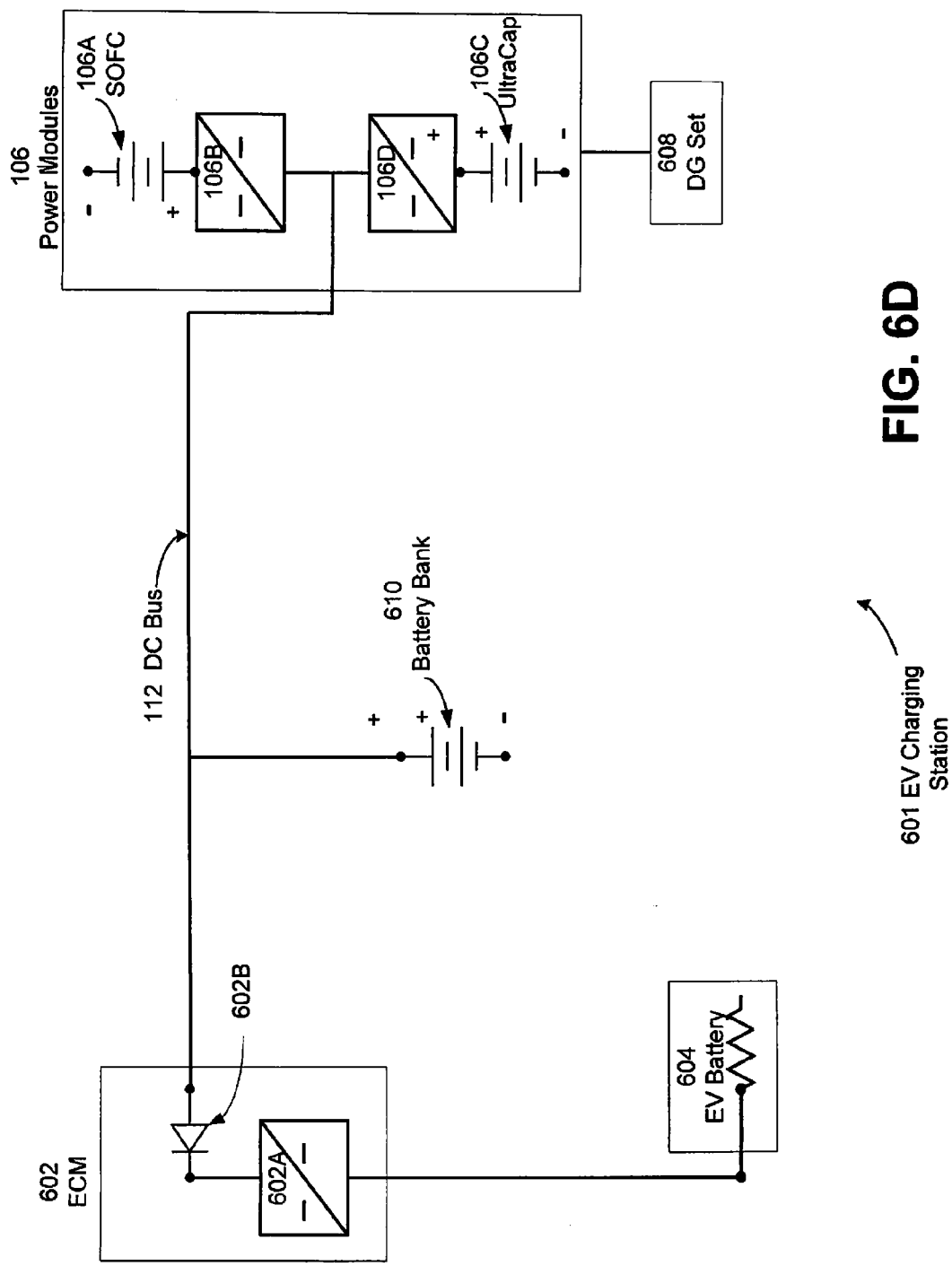

Referring to FIG. 6D, an EV charging station 601 comprises one or more power modules 106 and an ECM 602. This configuration of EV charging station is suitable for use where there is no grid power and no customer load is to be supplied. The EV charging station 601 is needed only to act as a power source for charging the EV battery 604. In this configuration, a battery bank 610 acts as the base load to the EV charging station 601. This battery bank 610 may be charged using normal charging (0.1 C). An operator of an EV in need of charging the EV battery 604 may obtain a charge from the ECM 602. Alternatively, the operator may exchange a discharged EV battery 604 for one of the batteries in the battery bank 610. The DG 608 set is used to start up the power modules 106.

In an embodiment, the EV charging station 601 is configured to take advantage of time-of-day pricing and to utilize the storage capacity of the EV batteries. For example, the cost of weekday electricity from 11 AM to 9 PM may be several times (e.g., 5 times) higher than the cost of electricity from 9 PM to 11 AM. In this embodiment, DC power is returned from the EV batteries to the fuel cell system to provide power during peak pricing periods and/or to support shortfalls in the power output from the power modules 106 due to an internal power module 106 fault.

Figure 6E:
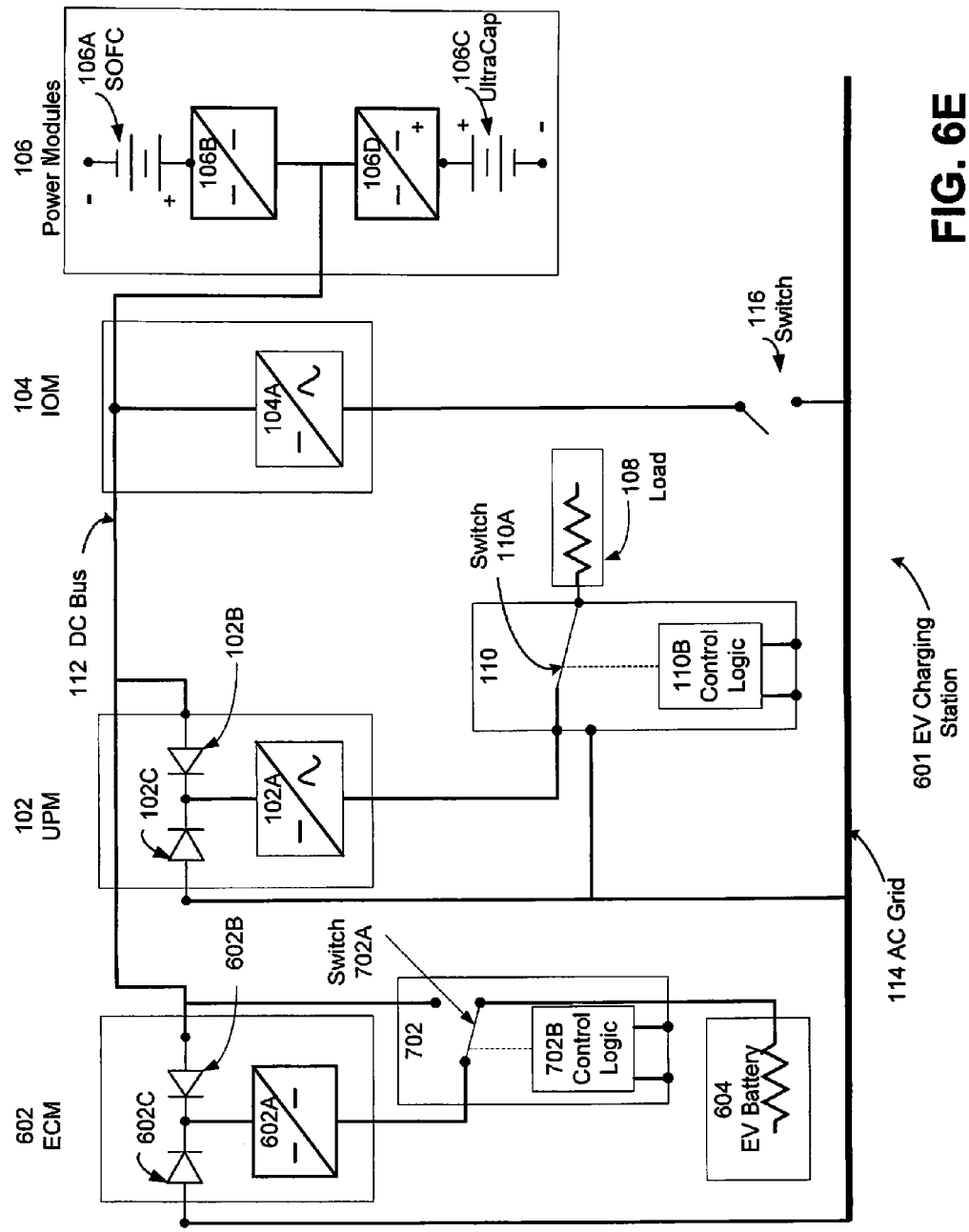

Referring to FIG. 6E, the fuel cell system comprises one or more power modules 106, an IOM 104, a UPM 102, a first control logic unit 110 described above, a switching module 702 containing a switch 702A and second control logic unit 702B, and an ECM 602. If desired, the separate logic units 110 and 702B may be physically combined into a single unit which performs the functions of the unit 110 described above and functions of unit 702B described below. In this embodiment, the power modules 106, IOM 104 and UPM 102 may be used to supply power to a customer load 108 (e.g., a building, such as an office building) while also being able to provide power to the grid, while the ECM 602 may be used for charging an EV battery 604 by drawing power from the 400V DC bus 112. Control logic unit 110 performs the functions as previously described. Control logic unit 702B performs the functions described below. Thus, the UPM 102 and ECM 602 are connected in parallel to the DC bus 112.

In an embodiment, the UPM 102 (e.g., the inverter 102A of UMP 102) is rated higher than would required to provide power to load 108 from the power modules 106 alone. The additional power handling capabilities are used to utilize additional DC power from EV batteries that are connected to the EV charging station 601 via ECM 602. The control logic unit 702B switches the switch 702A to connect the EV batteries 604 to the ECM 602 to receive power from ECM 602 or to DC bus 112 to provide power to the DC bus 112.

By way of illustration and not by way of limitation, the fuel cell system contains power module(s) 106 which are capable of delivering a first value of maximum power (e.g., 200 kW). The UMP 102 is rated to convert DC to AC to provide a second value of maximum power (e.g., 400 kW AC) which is greater than the first value. In other words, the inverter 102A is designed to convert more DC to AC power than the power module(s) are capable of providing. The UMP 102 uses the additional conversion capacity to convert DC power (e.g., up to 200 kW DC) from the EV batteries 604 to AC power to provide to the load 108 or to the grid 114.

Thus, DC power from an electric vehicle battery 604 is received at an electric vehicle charging module (ECM) 602 during a period of higher electricity price from the grid, the received power is provided to the at least one inverter 102A which converts the received DC power to AC power, and provides the AC power to a load (e.g., 108 or grid load 114).

In one embodiment, DC power is provided from the at least one fuel cell power module 106 to the ECM 602, and then provided from the ECM to the electric vehicle battery 604 when the cost of electricity is lower, prior to the step of receiving DC power.

The combination EV charging station 601 and fuel cell system may be located at a business having employees that drive electric cars. Using the time of day pricing set forth above, these employees would generally park their EVs at the business recharging docks and connect the EV batteries 604 to the ECM 602 for 8 to 10 hours during the work day. Typically, all the EV batteries 604 are fully charged (with the switch 702A connecting batteries 604 to ECM 602) before the price of power from the grid increases (e.g., by 11 AM) using the power provided from the ECM 602. Then, after the price of the grid power increases (e.g., after 11 AM), logic 702B switches the switch 702A position to connect the EV batteries 604 to the DC bus 112. The batteries 604 are then used to provide a portion (e.g., 10-75%, for example 50%) of their stored charge to the DC bus 112. For example, the EV batteries may receive more charge each day (or each week etc.) than they provide back to the DC bus. If desired, the owners of the EVs may not be charged for the net charge they received or be charged a reduced rate compared to the rate for charging EV batteries from the grid. The charging station could then deliver up to 400 kW AC to load 108 in a peak-shaving load-following manner. All parties would financially benefit because of the increased price of the mid-day electricity.

In another embodiment, the electric vehicle battery is charged at a location other than the ECM 602 during a lower cost electricity price period prior to the step of receiving DC power from the ECM 602 during the higher cost of electricity price period. For example, EVs are charged at a remote location (e.g., from the grid at home overnight) using lower cost, night time electricity.

In embodiment, charged EVs may then be connected to the ECM 602 in the morning. After the price of electricity increases mid-day (e.g., after 11 AM) the EV batteries 604 may be used to deliver a predetermined portion of their stored charge to the DC bus 112. This bus can then deliver up to 400 kW AC to a load 108 in a peak-shaving load-following manner. The EV owners may be reimbursed for the cost of provided power (i.e., for the power they stored at their home and delivered to the bus 112). Here again all parties financially benefit because of the higher price of mid-day electricity. Of course, the times used in the foregoing examples are for illustrative purposes only.

In an embodiment, the charging station may be configured to utilize power from the EV batteries to address the time-of-day pricing for the region in which the charging station is located.

In yet another embodiment, the energy source may be selected from multiple energy sources by a controller operating an algorithm that determines the demand value and cost of energy at a particular location and time the charge is initiated. The controller may continuously monitor available energy sources and may dynamically change the energy source during a charging event so as to provide the best and most reliable affordable energy for the EV station.

The above described methods and systems can be readily used with multiple generators in parallel with a large load, while allowing tight control of frequency and voltage.

Figure 11:
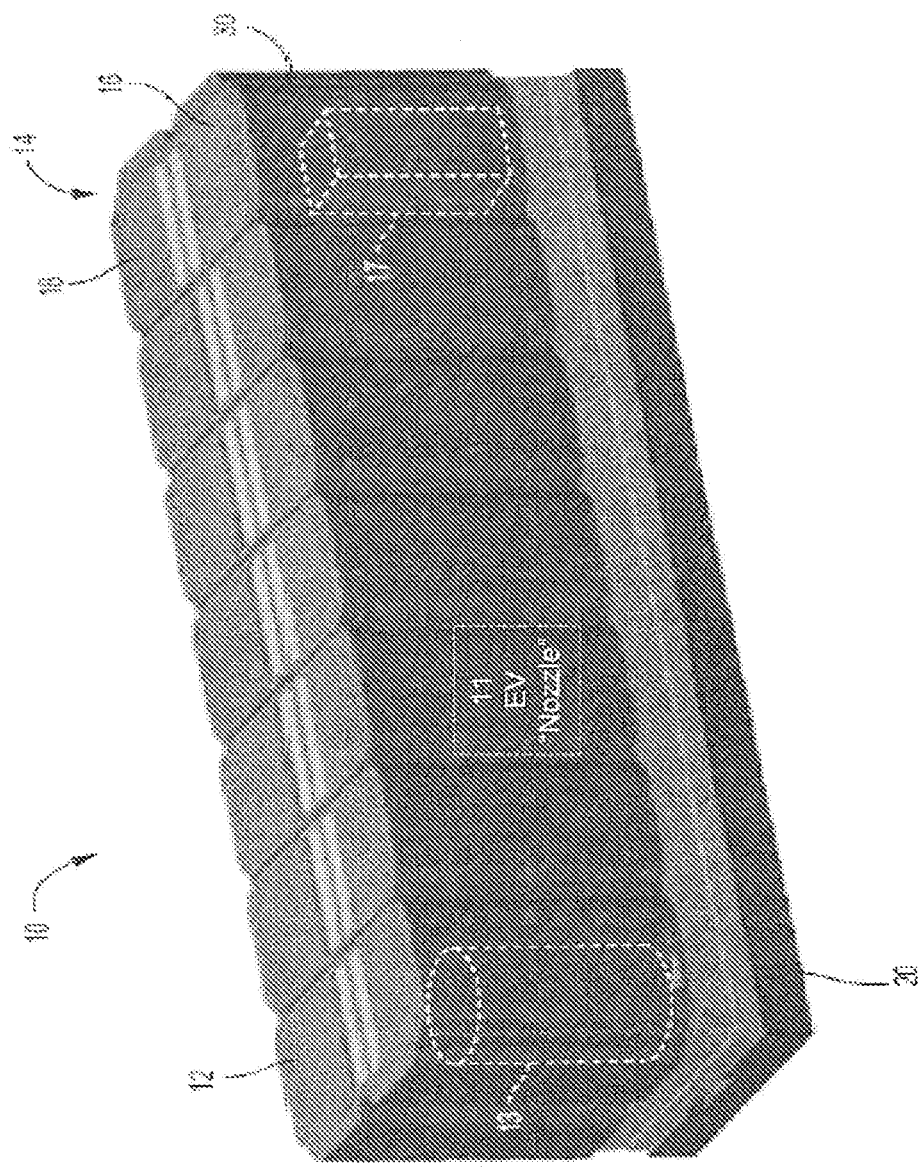
FIG. 11 is an isometric view of a modular fuel cell system enclosure that can be used with the exemplary embodiments.

As previously described, using a fuel cell system as a source for charging EV batteries provides a dynamic and more reliable EV charging station. In the following embodiment, fuel cell systems may be used in various configurations to provide EV charging stations having varying capabilities. Power may be supplied to the EV charging stations by a modular fuel cell system, for example, that includes fuel cell containing hot boxes and a housing containing inverters and other electronics, and an optional housing containing a fuel processing module (which may include, e.g., a desulfurizer, etc.). A description of an exemplary modular fuel cell system is provided in U.S. provisional application Ser. No. 61/386,257, filed Sep. 24, 2010, titled "Fuel Cell Mechanical Components," which is incorporated by reference in its entirety for the disclosure of this system. FIG. 11 illustrates an example of this system, as will be described below. However, the description is provided as an example only and any other fuel cell or DC power generation system may be used.

Figure 7A:
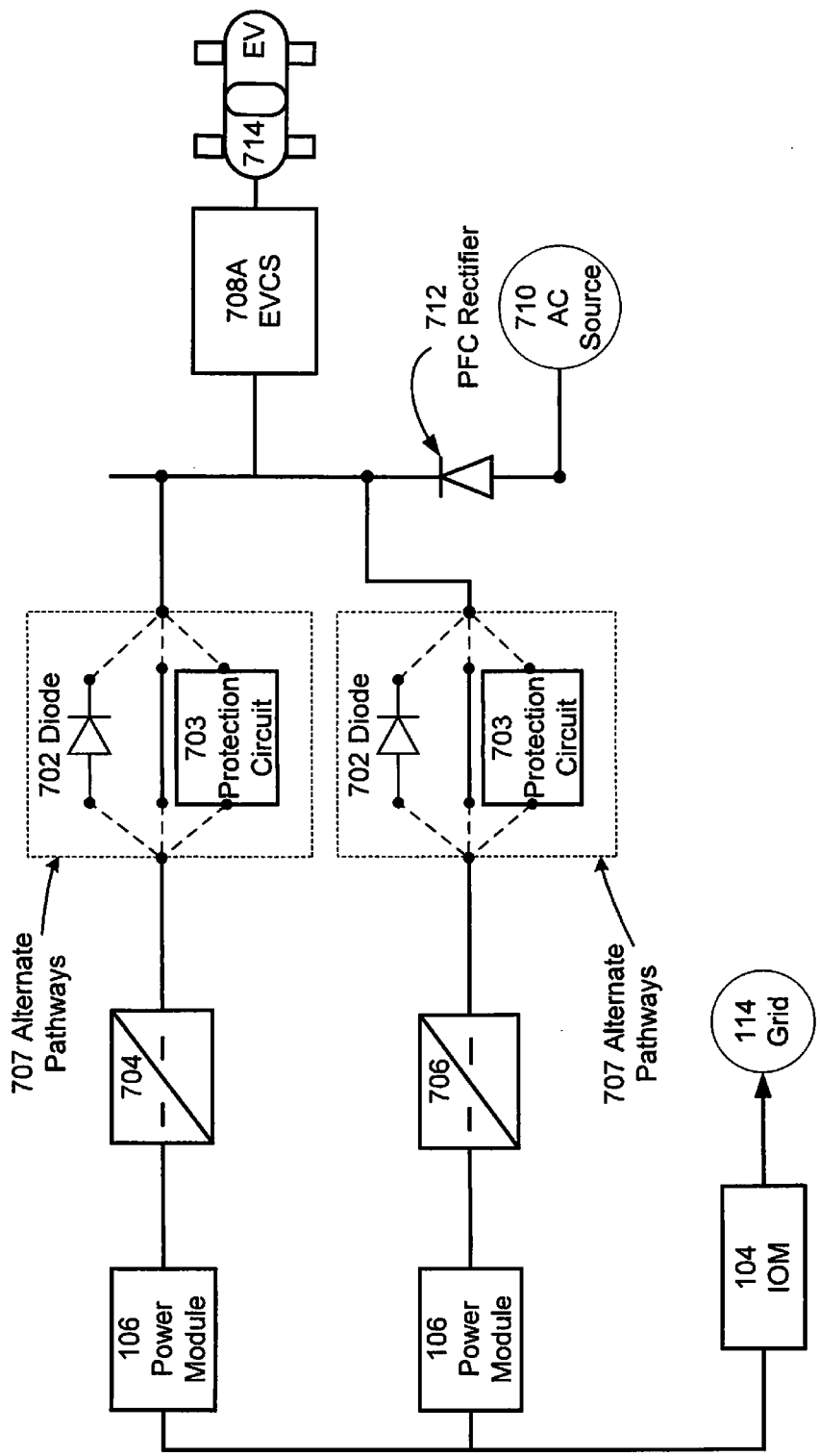
FIGS. 7-10 illustrate block diagrams of systems according to embodiments.

FIG. 7A is a block diagram illustrating a system for providing power to an electric vehicle (EV) charging station according to an embodiment. As illustrated in FIG. 7A, power modules 106 provide power, such as ±380 VDC, to DC/DC charging converters 704 and 706. Outputs of the DC/DC charging converters 704 and 706 supply power to an electric vehicle charging station (EVCS) 708A (e.g., charging tower or similar device). The pathway 707 from the DC/DC charging converters 704 and 706 to the EVCS 708A may be a direct connection, may be made via diodes 702 or may be made through a protection circuit 703. While two power module—charging converter pairs are illustrated, the EVCS 708A may be supplied with power by multiple power module—charging converter pairs.

When the diodes 702 are used in the path between the DC/DC charging converters and the EVCS, the diodes provide a diode-or configuration that allows the power provided to the input of the EVCS 708A to be provided by a single DC/DC charging converter 704 or 706 or by both.

In an alternative embodiment, the DC/DC charging converters 704 and 706 may be set at different set-points to allow the amount of charging power from each power module 106 to be differentially defined.

The EVCS 708A supplies DC power, such as, for example, 600 VDC, to charge a battery of an electric vehicle 714.

In yet another embodiment, one or more PFC corrected rectifiers 712 are supplied such that power from an AC source 710 may be used to provide peaking or backup to the charging station 708A via diode-or with the charging DC/DC converter output.

Figure 7B:
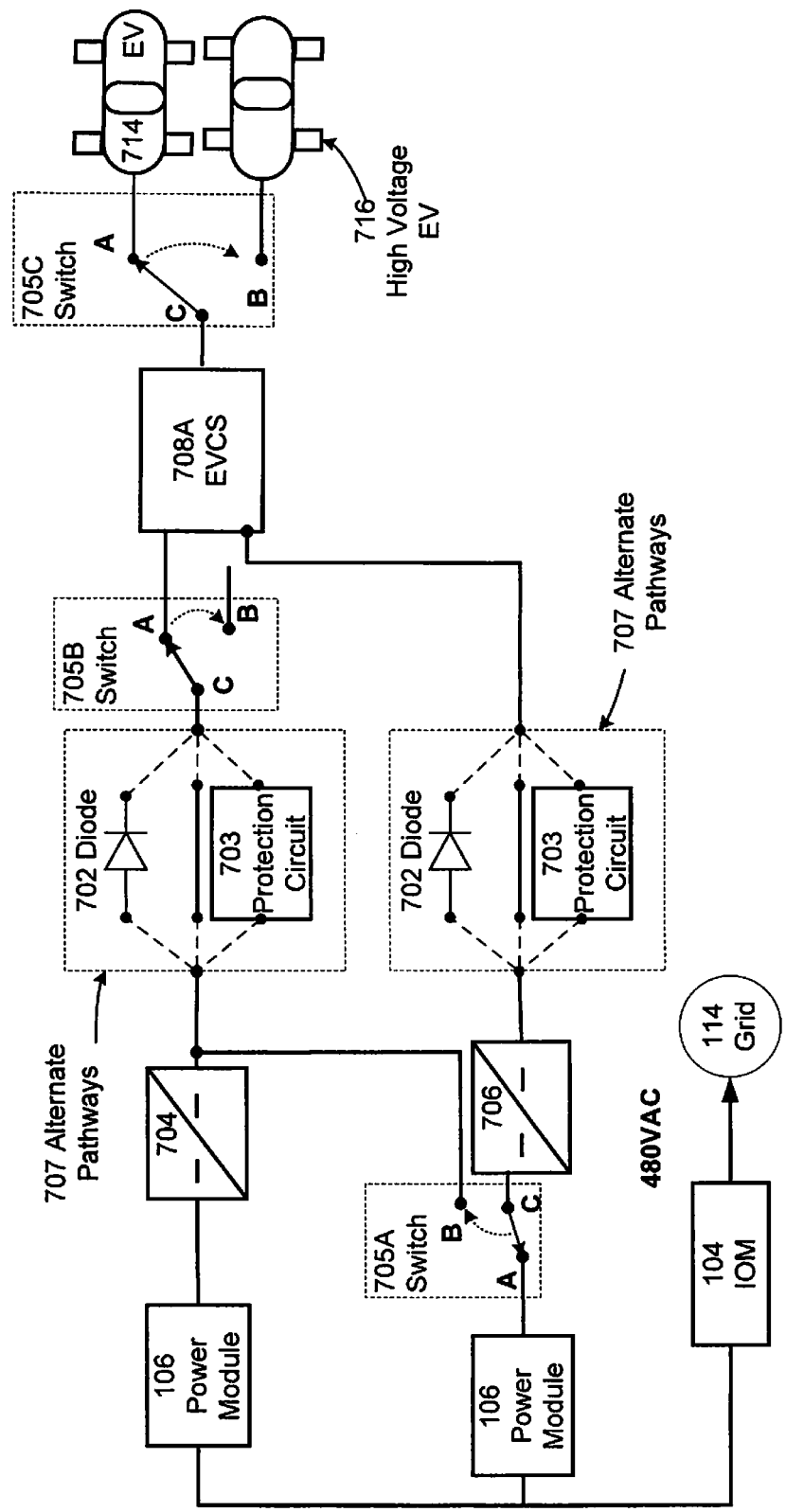

FIG. 7B is a block diagram illustrating a switching system for supplying power to an electric vehicle (EV) charging station according to an alternative embodiment.

In the alternative embodiment, switches 705A, B and C may be operated to provide different configurations of charging power modules 106 and EVCS 708A. In a first configuration, the input of one of the DC/DC charging converters 706 is switchable using a switch 705A. In the first configuration, a node A of the switch 705A is connected to a switchable node C of the switch 705A, a node A of switch 705B is connected to switchable node C of switch 705B, and a node A of switch 705C is connected to switchable node C of switch 705C. Node A of the switch 705A is connected to power module 106. The DC/DC charging converter 706 receives power, such as ±380 VDC, from a power module 106 via the connection of node C and node A of switch 705A. The charging DC/DC converter 704 provides power to the EVCS 708A via the connection of node C and node A of switch 705B. The EV 714 receives power from the EVCS 708A via the connection of node C and node A of switch 705C. Thus, both power modules provide power to the EVCS to charge the EV 714.

In a second configuration, a DC/DC charging converter 706 is configured to further boost the DC voltage of DC/DC charging converter 704. In this configuration, the input (node C of switch 705A) of DC/DC charging converter 706 is switched from the output of the power module 106 to the output of the DC/DC charging converter 704 (node B of switch 705A), a switchable node C of switch 705B is connected to node B of switch 705 B thereby disconnecting DC/DC converter 706 from direct electrical contact with EVCS 708A, and a switchable node C of switch 705C is connected to node B of switch 705C to connect a high voltage EV 716 (i.e., EV 716 is a higher voltage vehicle than EV 714) to the EVCS 708. For example, the output of DC/DC charging converter 706 in this configuration may exceed 600 VDC, such as 800 VDC or 1000 VDC.

In an embodiment, the operation of switches 705A, B and C may be controlled by a controller such that the connection of a high voltage EV 716 to the output of EVCS 708A instructs the switches 705A, B and C to move from a first configuration in which charging DC/DC converters 704 and 706 are connected in parallel to a second configuration in which charging DC/DC converters 704 and 706 are connected in series to the EVCS 708A. When the high voltage EV 716 is disconnected from EVCS 708A, the controller instructs the switches 705A, B and C to move from the second configuration to the first configuration.

The switches 705A, B and C may be separately located. Alternatively, depending on the locations of the charging DC/DC converters 704 and 706 relative to the EVCS 708A, switches 705A and 705B may be part of single physical device. Similarly, switches 705B and 705C may be part of single physical device.

The pathway 707 from the charging DC/DC converters 704 and 706 to the EVCS 708A may be a direct connection, may be made via diodes 702 or may be made through a protection circuit 703.

Figure 7C:
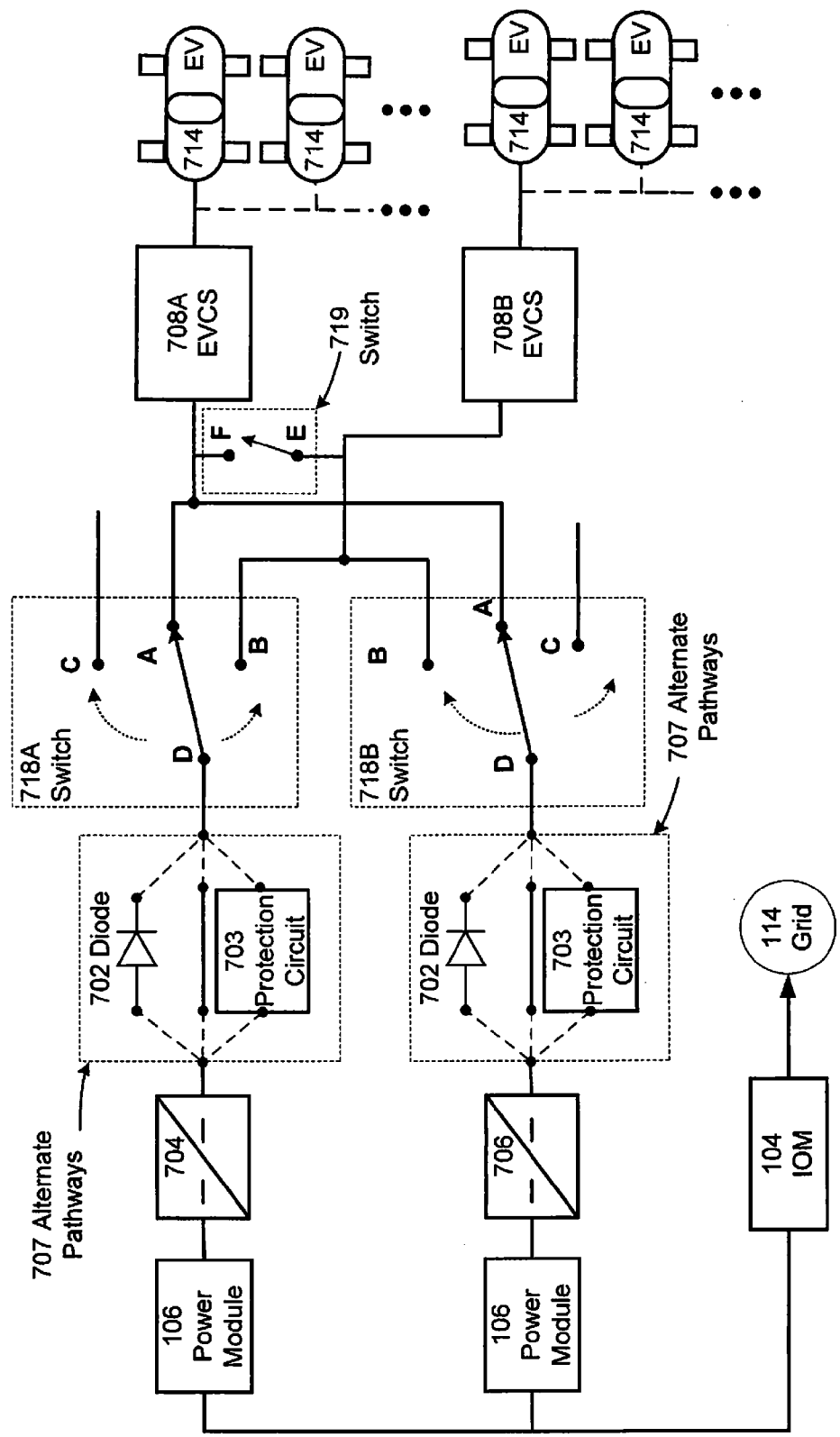

FIG. 7C is a block diagram illustrating a switching system for providing power to selected electric vehicle (EV) charging stations according to an embodiment.

The outputs of DC/DC charging converters 704 and 706 are connected to switchable nodes D of switches 718A and 718B respectively. The pathway 707 from the charging DC/DC converters 704 and 706 to the switches 718A and B may be a direct connection, may be made via diodes 702 or may be made through a protection circuit 703.

The switches 718A and 718B may be operated independently to provide different configurations of power modules 106 and EVCSs 708A and 708B. When the D nodes of switches 718A and B are connected to the respective A nodes of switches 718A and 718B, the charging DC/DC converters 704 and 706 supply power in parallel to EVCS 708A as previously described. When the D nodes of switches 718A and B are connected to the respective B nodes of switches 718A and 718B, the charging DC/DC converters 704 and 706 supply power to EVCS 708B in parallel as previously described. In each of these configurations, N power modules provide power to M EVCSs and N>M.

When the D node of switch 718A is connected to the A node of switch 718A and the D node of and 718B is connected to the B node of switch 718B, the charging DC/DC converter 704 supplies power to EVCS 708A and the charging DC/DC converter 706 supplies power to EVCS 708B. In this configuration, N power modules provide power to M EVCSs and N=M.

In another embodiment, a switchable node E of a switch 719 may connected to a node F to electrically connect EVCS 708A and EVCS 708B in parallel. When EVCS 708A and EVCS 708B are connected through switch 719, the switches 718A and 718B may be set so as to provide power to both EVCS 708A and EVCS 708B from one power module 106. For example, when the D node of switch 718A is connected to node A, the E node of switch 719 is connected to node F, and the D node of switch 718B is connected to node C of switch 718B, both EVCS 708A and EVCS 708B are supplied power by charging DC/DC converter 704. In this configuration, N power modules provide power to M EVCSs and N<M.

Thus, as described above, in some configurations of the system, N can equal to M, while in other configurations N may be greater than or less than M. If desired configurations can be used sequentially depending on the number and/or type of EVs being charged and other factors, such as the price of electricity, the price of fuel, the number of power modules available for producing power, etc. Using the switches 718A, 718B and 719, the power modules and EVCSs may be configured in ratios of 1:1 PMs 106 to EVCSs, 2:1 or greater PMs 106 to EVCSs, and a 2:1 or greater EVCSs to PMs 106.

Figure 8A:
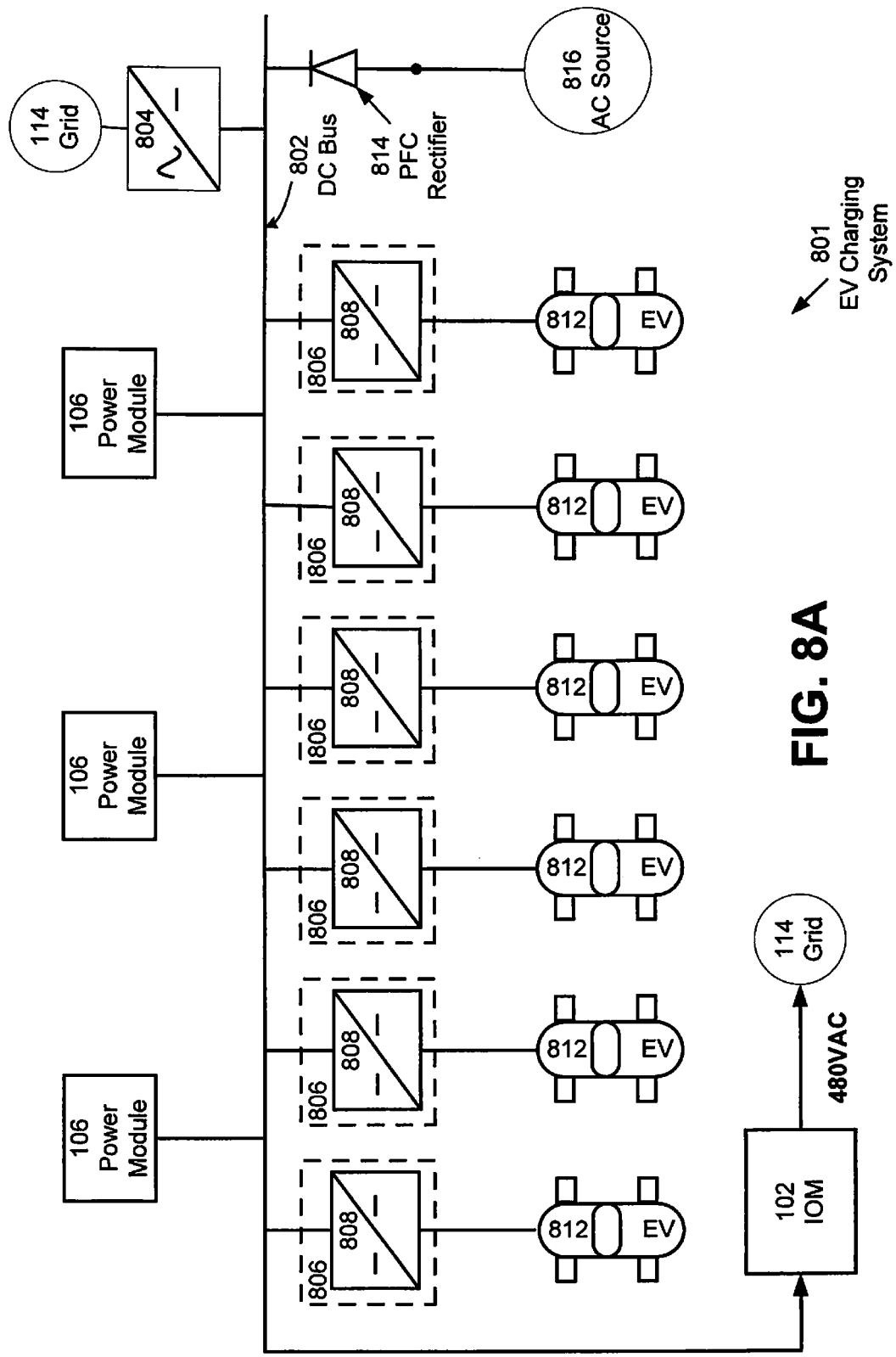

FIG. 8A is a block diagram illustrating a system for providing power to a plurality of electric vehicle (EV) charging stations according to an embodiment.

In this embodiment, an EV charging system 801 comprises M EVCSs 806 for M or more electric vehicles 812 and N power modules 106 for the "M" EVCSs 806, where N≠M and N<M or N>M. Power from the power modules, such as ±380 VDC, is supplied to a DC bus 802. The EVCSs 806 receive power from the DC bus 802 and supply power to the batteries of EVs 812. In an embodiment, the EVCSs 806 include a charging DC/DC converter 808 that receives power from the DC bus, for example, ±380 VDC, and boosts the voltage to a higher voltage suitable for charging the EV batteries, for example 600 VDC. In an alternative embodiment, the DC/DC charging converter 808 is housed in the power module 106 and DC bus 802 supplies charging voltage directly to the EVCSs 806.

In yet another embodiment, a PFC corrected rectifier 814 supplies power to the DC bus 802 from an AC source 816 (for example, a grid or diesel generator) to provide peaking or backup to the EVCSs 806 within charging system 801.

Figure 8B:
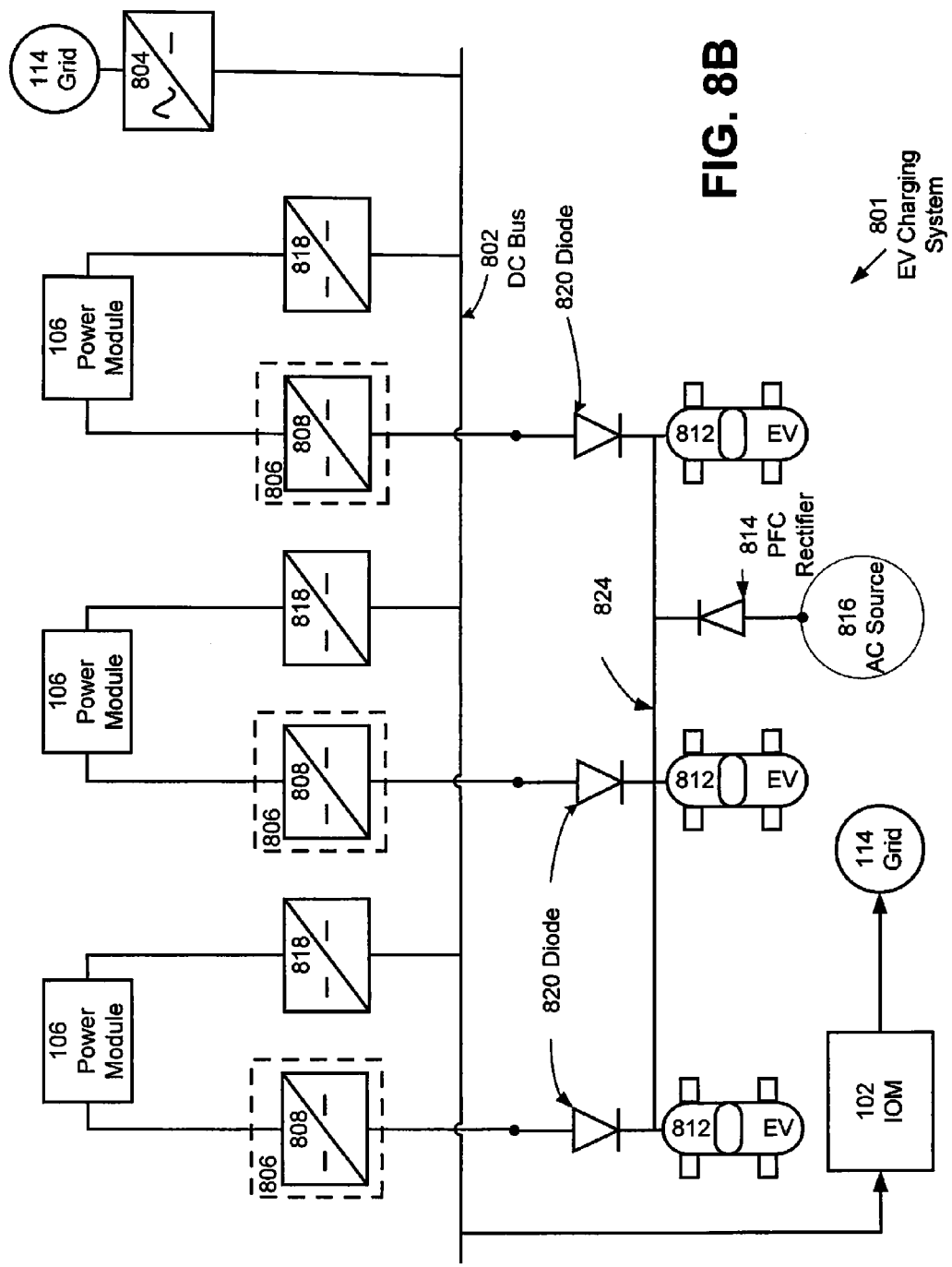

FIG. 8B is a block diagram illustrating a system for providing power to a plurality of electric vehicle (EV) charging stations and to a DC bus according to an embodiment.

In this embodiment, an EV charging system 801 comprises a DC bus 802 and EVCSs 806. Power from each of the power modules 106, such as ±380 VDC, is supplied electrically in parallel to DC bus 802 and EVCS 806 through a DC/DC charging converter 808 and a DC/DC bus converter 818 respectively. The charging stations 806 receive power from the DC/DC charging converters 808 and supply power to the batteries of EVs 812. For example, the DC/DC charging converters 808 may receive ±380 VDC from the power modules 106 and boost the voltage to a voltage suitable for charging the EV batteries, for example 600 VDC. The DC/DC bus converters 818 may receive power from the power modules 106 and provide a voltage for DC bus 802 that may be higher or lower than the voltage provided by the power modules 106. For example, the DC/DC bus converters 818 may boost the voltage to ±400 VDC or down convert the voltage to ±12 VDC.

In an alternative embodiment, a DC/DC charging converter 808 is housed in the power module 106 and the power module 106 supplies charging voltage directly to the EVCSs 806.

In yet another embodiment, the EVCSs 806 supply power to the EVs 812 through optional diodes 820. An optional AC source 816 (for example, a grid or diesel generator) is configured with an optional PFC corrected rectifier 814 to supply power to the EVs 812 via AC bus 824. The diodes 820 prevent AC from the AC bus 824 from reaching the DC bus 802 or converters 808, 818. The diodes 820 and rectifier 814 also form a diode-or circuit that selectively supplies power to the EVs 812.

Figure 9A:
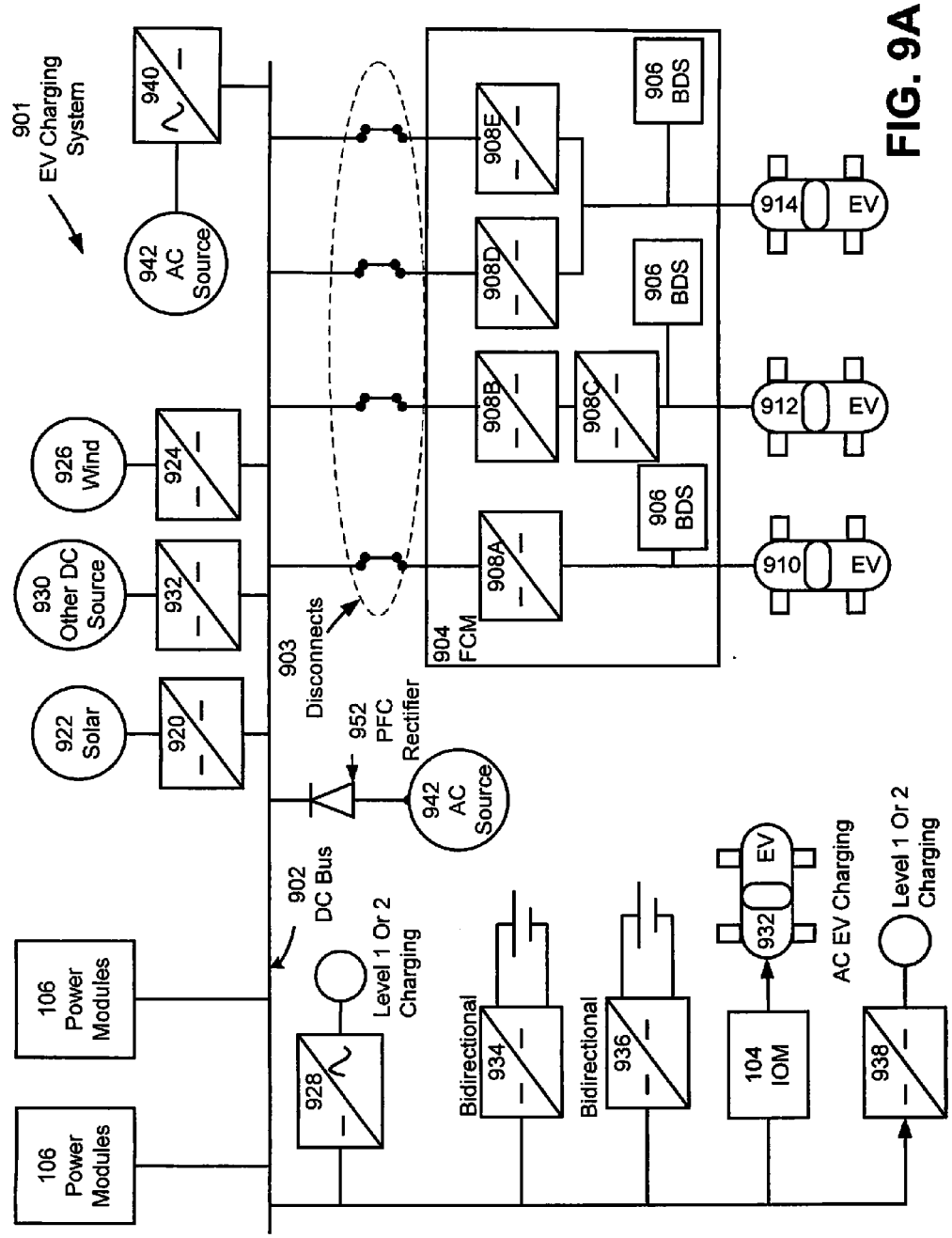

FIG. 9A is a block diagram illustrating a multi-source electric vehicle charging station according to an embodiment. In this embodiment, an EV charging system 901 comprises power modules 106 which supply DC power, such as ±380 VDC, to common bus 902. While two power modules 106 are illustrated, any number of power modules 106 (for example, N) may be connected to the common bus 902. By way of illustration and not by way of limitation, the voltage on the common bus 902 may be +/−380 VDC.

A fast charger module 904 draws power from the common bus 902 to supply power to a set of M DC/DC charging converters 908 that convert the voltage of the bus to a voltage suitable for charging the EV batteries, for example 600 VDC unipolar, 12 VDC unipolar, 24 VDC unipolar, 36 VDC unipolar or 48 VDC unipolar.

In an embodiment, one or more DC disconnects 903 (such as "combiner" or other solid state DC disconnect, such as solid state DC circuit interrupters) are provided between the power modules 106 and the fast charger module 904 for safety and/or maintenance.

The power modules 106 may be co-located with the fast charger module 904 and other elements of the EV charging system 901. Alternatively, the power modules 106 may be separately located and configured to supply power to the other elements of the EV charging system 901 via the common bus 902.

The DC/DC charging converters 908 may be configured to provide voltages and currents as required to charge the batteries of electric vehicles connected to the fast charger module 904. For example, fast charger module 904 may include a single DC/DC charging converter 908A for supplying power for charging a standard EV 910. For example, the DC/DC charging converter may be a boost converter to increase the voltage of the common bus 902 to a higher for voltage, for example 600 VDC.

Alternatively, the DC/DC charging converter 908A may be a down converter that reduces the voltage on the common DC bus 902 to a lower voltage for supplying power to electric powered equipment, such as a forklift, at voltages between 0 and 60 VDC, such as 12 VDC, 24 VDC, 36 VDC, 48 VDC and 60 VDC. The down converter may be a mobile device on a flexible cord to allow moving the down converter. Additionally, the fast charging module may include an outlet that receives voltage from the common DC bus 902 that may be connected to the portable down converter.

The fast charger module may also include two or more DC/DC charging converters 908B and 908C connected in series to achieve a higher voltage and power for a high performance car (or larger vehicle, such as a bus) 912 and/or two or more DC/DC charging converters 908D, 908E connected in parallel to achieve a higher current for a high performance car (or larger vehicle, such as a bus) 914.

Figure 9C:
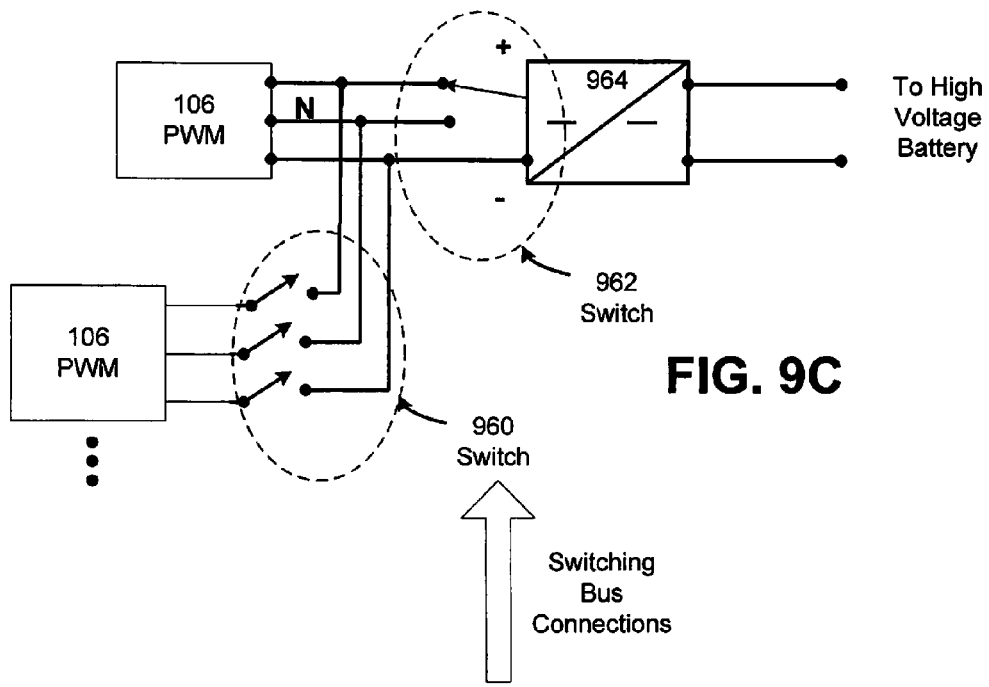
Figure 9B:
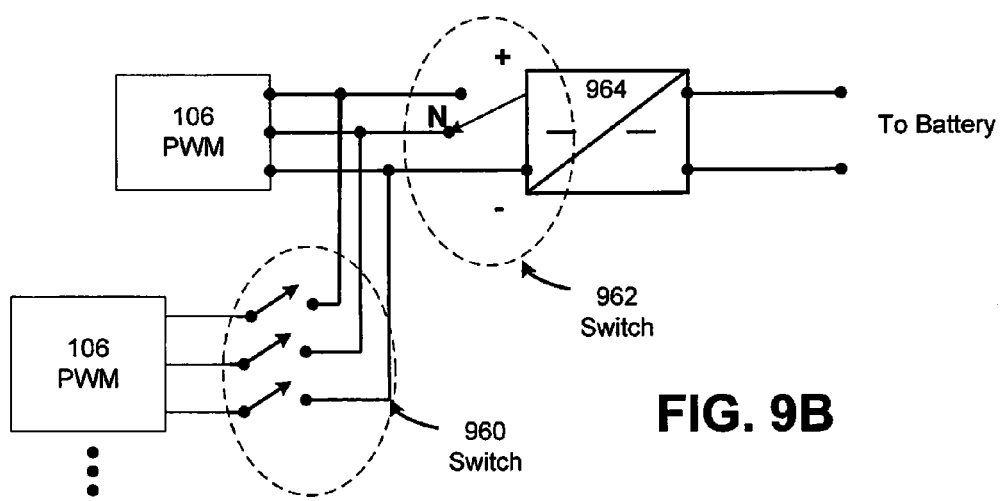

Alternatively, when a higher voltage is required, a charging DC/DC converter can switch mode and use the +/− VDC range of a split bus or simply use a configuration using only +/− VDC, skipping the common as shown in FIG. 9B. In an alternative embodiment, a DC/DC down converter is used when the output of the converter is always lower than the input.

The fast charger module 904 may include optional battery docking stations 906 to allow for battery charging off-line and swapping of fully charged batteries.

In an alternative embodiment, the common DC bus 902 may be supplied power by one or more alternative DC sources, such as a solar array 922, a wind farm 926 and any other DC source 930. Power from the solar array 922 may be provided to the common DC bus 902 via a DC/DC converter 920 and from another DC source 930 via DC/DC converter 932. Power from the wind farm 926 may be provided to the common DC bus 902 via a DC/DC converter 924. The common DC bus 902 may also be supplied from AC source 942. By way of example and not by way of limitation, the AC source 942 may be an AC grid or the output from an AC diesel generator. The AC power is supplied from the AC source 942 is supplied to an inverter 940 which in turn provides DC power to the common DC bus 902.

In still another embodiment, a power factor corrected rectifier 952 may be used to provide power to the common DC bus 902 from the AC source. By way of example and not by way of limitation, the AC source 942 may be an AC grid or the output from an AC diesel generator.

In another embodiment, a bi-directional charger 934 is provided for electrical vehicle or electrical battery manufacturers in order to pre-charge EV batteries, to provide testing of battery charging and to provide testing of battery discharging. In an alternative embodiment, the discharge portion of this cycle may be accomplished using a resistive load instead of via the bi-directional charger 934.

In still another embodiment, a bi-directional charger 936 is provided to allow an EV customer to conduct a test discharge and test charge cycle on an EV battery in order to determine the health of the battery. The discharge portion of this cycle may be accomplished using a resistive load instead of via the bi-directional charger 936.

In yet another embodiment, an IOM 104 is configured to provide AC power to an AC-using EV 932. For example, the IOM output transformer may include 120 VAC/240 VAC taps that may be used to supply a Level 1 or Level 2 charger. For example, an IOM may be configured to supply AC for charging of RVs.

In an embodiment, a small 380V to 120 VAC or 380V to 240 VAC inverter 928 is provided to generate AC power for a Level 1 or Level 2 charger. When allowed by the on-board rectifier of the vehicle, the DC equivalent of Level 1 or Level 2 is provided by a DC/DC converter 938 for lower cost and higher efficiency. For example, 177 VDC may be supplied instead of 120 VAC and 335 VDC may be supplied instead of 240 VAC. The DC output of DC/DC converter 938 may be adjusted depending upon what is allowed by the EV's internal charger.

In an embodiment, the EV charging system 901 includes a sequencing controller that allocates power from all sources to the various charging stations according to a priority scale. For example, emergency vehicles or customers paying a premium fee may be conducted first, at a higher power, at a higher current or at a higher voltage. The sequencing controller may comprise a general purpose computer or a logic chip.

FIGS. 9B and 9C are block diagrams illustrating power modules in a switched bus configuration according to an embodiment.

In situations that demand higher power for charging, power modules 106 may be switched to connect two or more power modules 106 in parallel to provide power to a split DC bus. In FIGS. 9B and 9C a switch 960 (illustrated in the open position) is configured to connect the split bus connections (+DC, −DC and neutral) in parallel to provide additional current to a DC/DC charging converter 964.

Also illustrated in FIGS. 9B and 9C is switch 962. As illustrated in FIG. 9B, switch 962 is positioned to supply power from the negative and neutral lines of a split DC bus to a DC/DC charging converter 964. In FIG. 9C, the switch is positioned to supply power from the positive and negative lines of a split DC bus to a DC/DC charging converter 964. The voltage provided by the configuration illustrated in FIG. 9C is thus twice the voltage provided by the configuration illustrated in FIG. 9B. The DC/DC charging converters 964 may be down converters or up-down converters depending on the battery to be charged. Thus, the voltage of the DC/DC converter 964 in the EVCS may be switched based on the type of vehicle or battery being charged.

Figure 10:
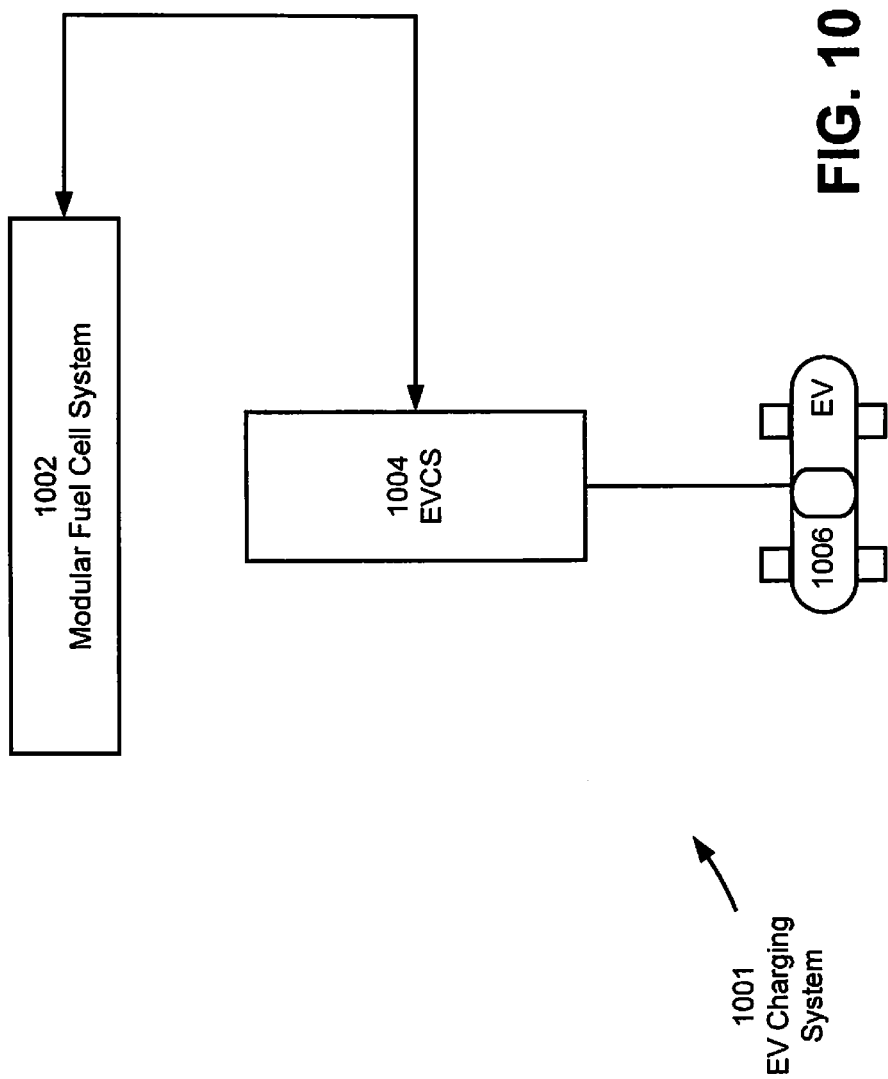

FIG. 10 is a block diagram illustrating a configuration of an EV charging system according to an embodiment. An EV charging system 1001 includes a modular fuel cell system 1002 and a EVCS 1004. An exemplary modular fuel cell system 1002 is illustrated in more detail in FIG. 11.

In an embodiment, the EVCS 1004 corresponds to the ECM 602 described in FIGS. 6A-6E. In this embodiment, the EVCS 1004 includes at least one charging DC/DC converter 602A that provides a voltage suitable for charging EV 1006 (for example, 300 VDC-600 VDC).

In another embodiment, the modular fuel cell system 1002 includes power electronics, including one or more DC/DC charging converters, to provide a voltage suitable for charging EV 1006 (for example, 300 VDC-600 VDC). In this embodiment, the EVCS 1004 includes the connection hardware (sometimes referred to as a "nozzle") to the EV 1006 and a user interface such as a payment interface or a charging preference selection interface. The EVCS 1004 may be configured to keep the nozzle or connector off the ground and to retract the electrical cord to prevent tangling. The EVCS 1004 may also include status indications such as charge capacity lights to indicate charging status, a relative state of charge of the EV battery, a charge count-down timer, a charging rate indicator, an indicator of avoided $CO_2$, and an estimated vehicle range, among other data.

In an embodiment, the modular fuel cell system 1002 and the EVCS 1004 may be remote from each other. Both the modular fuel cell system 1002 and the EVCS 1004 may include structural elements to provide protection from vehicle collision. In another embodiment, the EVCSs are positioned and configured to allow vehicles access to the charging nozzles. The EVCSs may also include disconnect devices to disconnect a EVCS from the modular fuel cell system in the event of damage caused by a vehicle.

FIG. 11 is a block diagram illustrating elements of a modular fuel cell system configured for charging EVs according to an embodiment.

Referring to FIG. 11, a modular fuel cell system enclosure 10 is shown according to an exemplary embodiment. The modular system may contain modules and components described above as well as in U.S. patent application Ser. No. 11/656,006, filed on Jan. 22, 2007, and incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system enclosure 10 includes a plurality of power modules 12 (which are labeled 106 in FIGS. 1-6), one or more fuel input (i.e., fuel processing) modules 16, and one or more power conditioning (i.e., electrical output) modules 18 (which are labeled 104 and referred to as "IOM" in FIGS. 1-6). For example, the system enclosure may include any desired number of modules, such as 2-30 power modules, for example 6-12 power modules. FIG. 11 illustrates a system enclosure 10 containing six power modules 12 (one row of six modules stacked side to side), one fuel processing module 16, and one power conditioning module 18 on a common base 20. Each module 12, 16, 18 may comprise its own cabinet. Alternatively, as will be described in more detail below, modules 16 and 18 may be combined into a single input/output module 14 located in one cabinet. While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 11, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in the preferred embodiment, the input/output module 14 is at the end of the row of power modules 12, it could also be located in the center of a row power modules 12.

The modular fuel cell system enclosure 10 may be configured in a way to ease servicing of the system. All of the routinely or high serviced components (such as the consumable components) may be placed in a single module to reduce amount of time required for the service person. For example, the purge gas and desulfurizer material for a natural gas fueled system may be placed in a single module (e.g., a fuel processing module 16 or a combined input/ output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Each of the power modules 12 and input/output modules 14 include a door 30 (e.g., hatch, access panel, etc.) to allow the internal components of the module to be accessed (e.g., for maintenance, repair, replacement, etc.). According to an exemplary embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

As described previously, DC/DC charging converters may be located in either the EVCS (FIG. 10, 1004) or in the modular fuel cell system enclosure 10. In an embodiment, the modular fuel cell system enclosure 10 is equipped with one or more EV "nozzles" or electrical charging interfaces 11 mounted on the exterior of the system (e.g., outside housing 14 of system enclosure 10 in FIG. 11).

The modular fuel cell system enclosure 10 and/or the EVCS (FIG. 10, 1004) may include arc flash detection equipment such that if there is an arc, the light emitted by the arc is detected and the circuit to a charging EV is interrupted. Additionally, the modular fuel cell system enclosure 10 and/or the EVCS (FIG. 10, 1004) may include "fire eye" detectors that detect the wavelength of flames, and if these are detected the circuit to a charging EV is interrupted. Alternatively or additionally, the modular fuel cell system enclosure 10 and/or the EVCS 1004 may include thermal sensors which can detect the exothermic event which might come from a vehicle fire such as a battery fire and, if detected, interrupt the circuit to a charging EV.

When the charging of an EV is interrupted because of the detection of an arc or a fire, the modular fuel cell system enclosure 10 may trigger emergency responses such as paging, fire extinguishment systems such as water spray, a message to the car instructing the car to carry out safety functions, shut-down of adjacent vehicle chargers to prevent a cascade of the incident, a water spray wall between affected car and neighboring cars in order to prevent a cascade of the incident to other vehicles, a water spray wall between the vehicle and the EVCS 1004 and the modular fuel cell system enclosure 10 to prevent spread of the incident to the modular fuel cell system enclosure 10.

In an embodiment, the charging of battery modules may be halted and batteries briefly discharged in order to fully balance the charge of the battery modules. During this time, the EV charging system 1001 may take actions to optimize performance. For example, the power being supplied to an EV battery may be rapidly shifted to AC (or other) output power production. This allows the modular fuel cell system enclosure 10 to maintain its full rated output and maximizes function for the customer. Because the tie in point for the charging power for AC power generation is from the DC bus of the system, this transition may be made very quickly.

The EV charging system may also deliver a small ripple current to EV batteries under charge in order to derive vehicle battery impedance. The ability to measure AC impedance spectrums is possible when a driving current contains at least some ripple. When battery charging is halted for battery equalization, a current interrupt impedance may be derived. The impedance data may be stored or downloaded to the car to determine battery health.

In an embodiment, the EVCS 1004 may include voltage for interlock signals between the vehicle and the modular fuel cell system enclosure 10. This voltage would be a low voltage signal such as 12 VDC. The state of grounding between the vehicle and the EVCS 1004 may be such that the vehicle is grounded and the EVCS 1004 output is ungrounded. Because the high voltage output of the EVCS 1004 is isolated, ground loops may be avoided or minimized.

In an embodiment, the signals, such as controller area network (CAN) signals, between the EV under charger and the EVCS 1004 may pass through opto-isolators such that the ground state of the two sets of CAN messages (vehicle and charger) will be allowed to have two different grounding states.

In an embodiment, the EVCS 1004 may include DC/DC converter(s) that are bi-directional (for example, DC/DC converters 934 and 936). The bi-directional DC/DC converters may be configured to charge EV batteries or to discharge EV batteries. Using this functionality, a test discharge may be performed at the following events:

i. When instructed by the EV owner (for example, at the EVCS)

ii. When an EV is first manufactured (for example, at the end of an assembly line)

iii. When EV battery packs are manufactured (for example, at the end of the manufacturing process)

In an embodiment, when the test discharge is conducted, the power drawn from the batteries may be pushed to the power grid via inverters in the modular fuel cell system enclosure 10, and thus not wasted. Further, a resistive load or other set of inverters need not be purchased.

In an embodiment, an EV owner may be offered payment in exchange for allowing the stored energy stored in the EV to be used as a spinning reserve. If the owner accepts the offer, bi-directional DC/DC converters used for charging may be used to shift power from EV batteries through inverters in the modular fuel cell system enclosure 10 to create additional power when called upon by the utility for grid stability power injection.

In still another embodiment, a bi-directional DC/DC converter may be used to allow a fully charged EV to provide power to a discharged EV battery.

As described previously, DC/DC charging converters may be located in either the EVCS (FIG. 10, 1004) or in the modular fuel cell system enclosure 10. In either configuration, the "nozzle" at the EVCS or at the modular fuel cell system enclosure 10 may be configured with protection diodes such that if vehicle battery terminals are reversed, current flow will be blocked. An alarm on the unit (main unit or tower) may indicate to the user that his vehicle has a defect with the battery wiring.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An electric vehicle battery charging system comprising:
   a plurality of electric vehicle charging stations; and
   a plurality of power modules,
   a first switching device comprising one or more switches and a plurality of configurations,
   wherein each of the plurality of power modules comprises at least one fuel cell segment,
   wherein M of the plurality of electric vehicle charging stations receive power from N of the plurality of power modules,
   wherein in at least one configuration M is not equal to N,
   wherein the plurality of electric vehicle charging stations are configured to electrically connect to a plurality of electric vehicle batteries belonging to a plurality of electric vehicles,
   wherein in a first configuration of the first switching device, a first power module of the N power modules is electrically connected to a first electric vehicle charging station of the M electric vehicle charging stations, and
   wherein the plurality of power modules are disposed outside of the plurality of electric vehicles.

2. The system of claim 1 wherein the system comprises the M electric vehicle charging stations and the N power modules.

3. The system of claim 1 further comprising:
   a first charging DC/DC converter electrically connected to an output of the first power module of the plurality of power modules; and
   a second charging DC/DC converter electrically connected to an output of a second power module of the plurality of power modules,
   wherein an output of the first charging DC/DC converter is electrically connected to a common node,
   wherein an output of the second DC/DC converter is electrically connected to the common node, and
   wherein a first electric vehicle battery charging device of the plurality of electric vehicle charging stations is electrically connected to the common node.

4. The system of claim 3 wherein:
- an output of the first charging DC/DC converter is electrically connected to a common node through a first diode; and
- an output of the second DC/DC converter is electrically connected to the common node through a second diode to form a diode-or circuit, and
- the common node is selectively supplied power from at least the first or the second charging DC/DC converter by the diode-or circuit.

5. The system of claim 4 wherein the diode-or circuit further comprises a power factor corrected rectifier electrically connected to an alternating current (AC) source and to the common node, wherein the common node is selectively supplied power from at least the first or second charging DC/DC converter and the AC source by the diode-or circuit.

6. The system of claim 3 wherein:
- an output of the first charging DC/DC converter is electrically connected to a common node through a first protection circuit;
- an output of the second DC/DC converter is electrically connected to the common node through a second protection circuit, and
- the common node is selectively supplied power from at least the first or the second charging DC/DC converter by the first and second protection circuits.

7. The system of claim 1 further comprising:
- a first charging DC/DC converter having an input electrically connected to an output of a first power module; and
- a second charging DC/DC converter having an input electrically connected to an output of the first charging DC/DC converter, wherein an output of the second charging DC/DC converter is electrically connected to an electric vehicle charging station of the plurality of electric vehicle charging stations.

8. The system of claim 1 further comprising:
- a second switching device comprising one or more switches having at least a first configuration, wherein:
- a first charging DC/DC converter having an output electrically connected to the first switching device and the second switching device, and having an input electrically connected to an output of the first power module of the N power modules;
- a second charging DC/DC converter having an output electrically connected to the first electric vehicle charging station and having an input electrically connected to the second switching device,
- wherein in the first configuration of the second switching device, an input of the second charging DC/DC converter is electrically connected to an output of a second power module of the N power modules, and
- wherein in the first configuration of the first switching device the output of the first charging DC/DC converter is electrically connected to the first electric vehicle charging station.

9. The system of claim 8, wherein the second switching device comprises a second configuration wherein in the second configuration of the second switching device, the input of the second charging DC/DC converter is electrically connected to the output of the first charging DC/DC converter.

10. The system of claim 1 further comprising:
- a first charging DC/DC converter having an input electrically connected to an output of the first power module of the N power modules and having a first output electrically connected to the first switching device; and
- a second charging DC/DC converter having an input electrically connected to an output of a second power module of the N power modules and having a second output electrically connected to the first switching device,
- a first common node electrically connected to the first electric vehicle charging station of the M electric vehicle charging stations, and
- wherein in the first configuration of the first switching device, the first output of the first charging DC/DC converter is electrically connected to the first common node and the second output of the second DC/DC converter is electrically connected to the first common node.

11. The system of claim 10 further comprising a second common node electrically connected to a second electric vehicle charging station of the M electric vehicle charging stations,
- wherein the first switching device comprises a second configuration and wherein in the second configuration of the first switching device, the first output of the first charging DC/DC converter is electrically connected to the second common node and the second output of the second DC/DC converter is electrically connected to the second common node.

12. The system of claim 10 wherein the first switching device comprises a third configuration and wherein in the third configuration of the switching device, the first output of the first charging DC/DC converter is electrically connected to the first electric vehicle charging station and the second output of the second DC/DC converter is electrically connected to a second electric vehicle charging station.

13. The system of claim 2 further comprising a DC bus, wherein the N power modules supply power to the DC bus and wherein the DC bus supplies power to the M electric vehicle charging stations.

14. The system of claim 2 further comprising a DC bus, wherein the N power modules are electrically connected in parallel to the DC bus via N DC/DC converters and to the M electric vehicle charging stations.

15. The system of claim 1 further comprising a DC bus and at least one alternative DC source, wherein the DC bus receives power from at least two of the plurality of power modules and the at least one alternative DC source and wherein the plurality of electric vehicle charging stations receive power from the DC bus.

16. The system of claim 15, wherein the plurality electric vehicle charging stations are electrically connected to the DC bus via a disconnect module.

17. The system of claim 16, wherein the first electric vehicle charging station further comprises a charging DC/DC converter for supplying power to a battery of an electric vehicle from the DC bus.

18. The system of claim 16, wherein the first electric vehicle charging station further comprises at least two charging DC/DC converters electrically connected in series for supplying power to a battery of an electric vehicle from the DC bus.

19. The system of claim 16, wherein the first electric vehicle charging station further comprises at least two charging DC/DC converters electrically connected in parallel for supplying power to a battery of an electric vehicle from the DC bus.

20. The system of claim 16 further comprising one or more battery docking stations configured to receive an electric vehicle battery for charging.

21. The system of claim 16 further comprising a DC/AC inverter electrically connected to the DC bus and configured to supply AC to an electric vehicle for charging a battery of the electric vehicle.

22. The system of claim 16, wherein the first electric vehicle charging station further comprises a bidirectional DC/DC converter electrically connected to the DC bus and configured to supply DC to an electric vehicle for charging a battery of the electric vehicle or to receive power from the battery of the electric vehicle.

23. A method for providing power to an electric vehicle battery charging system, the method comprising:
supplying power from N power modules disposed outside of a plurality of electric vehicles to M electric vehicle charging stations configured to electrically connect to X electric vehicle batteries belonging to the plurality of electric vehicles,
wherein each of the N power modules comprises at least one fuel cell segment,
wherein in at least one configuration M is not equal to N, and
wherein supplying power from N power modules to M electric vehicle charging stations includes supplying power from a first power module of the N power modules to a first electric vehicle charging station of the M electric vehicle charging stations via a first switching element in a first configuration.

24. The method of claim 23 wherein supplying power from the N power modules to the M electric vehicle charging stations comprises:
supplying power to a first charging DC/DC converter the first power module of the N power modules;
supplying power to a second charging DC/DC converter from a second power module of the N power modules;
supplying power from an output of the first charging DC/DC converter to a common node;
supplying power from an output of the second DC/DC converter to the common node; and
supplying power to the first electric vehicle charging station of the M electric vehicle charging stations from the common node.

25. The method of claim 23 wherein supplying power from N power modules to a M electric vehicle charging stations comprises:
supplying power from the first power module of the N power modules to a first charging DC/DC converter;
supplying power to a common node from an output of the first charging DC/DC converter through a first diode;
supplying power from a second power module of the N power modules to a second charging DC/DC converter;
supplying power to the common node from an output of the second charging DC/DC converter through a second diode, wherein the first and second diodes form a diode-or circuit.

26. The method of claim 25 wherein the diode-or circuit further comprises a power factor corrected rectifier electrically connected to an alternating current (AC) source and to the common node, and wherein the method further comprises supplying power to the common node selectively from at least the first or the second charging DC/DC converter and the AC source by the diode-or circuit.

27. The method of claim 23 wherein supplying power from the N power modules to the M electric vehicle charging stations comprises:
supplying power from the first power module of the N power modules to a first charging DC/DC converter;
supplying power to a common node from an output of the first charging DC/DC converter through a first protection circuit;
supplying power from a second power module of the N power modules to a second charging DC/DC converter;
supplying power to the common node from an output of the second charging DC/DC converter through a second protection circuit.

28. The method of claim 23 wherein supplying power from the N power modules to the M electric vehicle charging stations comprises:
supplying power to a first charging DC/DC converter from the first power module of the N power modules;
supplying power to a second charging DC/DC converter from the first charging DC/DC converter; and
supplying power to the first electric vehicle charging station of the M electric vehicle charging stations from the second charging DC/DC converter.

29. The method of claim 28 wherein supplying power from the first charging DC/DC converter to a second charging DC/DC converter comprises supplying power via a second switching element in a first configuration.

30. The method of claim 29 wherein:
supplying power from the N power modules to the M electric vehicle charging stations comprises:
supplying power from the first charging DC/DC converter to the first electric vehicle charging station via the first switching element;
and
supplying power from the second charging DC/DC converter to the first electric vehicle charging station;
and
supplying power from the first charging DC/DC converter to a second charging DC/DC converter comprises supplying power to the second charging DC/DC converter from a second power module of the N power modules via the second switching element in a second configuration.

31. The method of claim 23 wherein supplying power from the N power modules to the M electric vehicle charging stations comprises:
supplying power to a first charging DC/DC converter from a first power module of the N power modules;
supplying power from the first charging DC/DC converter to a first common node via the first switching element in the first configuration;
supplying power to a second charging DC/DC converter from a second power module of the N power modules;
supplying power from the second charging DC/DC converter to the first common node via a second switching element in a first configuration; and
supplying power to the first electric vehicle charging station of the M electric vehicle charging stations via the first common node.

32. The method of claim 31 wherein supplying power from the N power modules to the M electric vehicle charging stations further comprises:
supplying power from the first charging DC/DC converter to a second common node via the first switching element in a second configuration;
supplying power from the second charging DC/DC converter to the second common node via the second switching element in a second configuration; and supplying power to a second electric vehicle charging station of the M electric vehicle charging stations via the second common node.

33. The method of claim 32 wherein supplying power from the N power modules to the M electric vehicle charging stations comprises:
supplying power from the first charging DC/DC converter to the first electric vehicle charging station of the M electric vehicle charging stations via the first switching element in a third configuration; and
supplying power from the second charging DC/DC converter to the second electric vehicle charging station of the M electric vehicle charging stations via the second switching element in a third configuration.

34. The method of claim 23 further comprising:
supplying power from the N power modules to a DC/DC bus; and
supplying power from the DC bus to the M electric vehicle charging stations.

35. The method of claim 23 further comprising;
supplying power from the N power modules to a DC bus, wherein N power modules are electrically connected in parallel to the DC bus via N DC/DC converters; and
supplying power from the N power modules to the M electric vehicle charging stations in parallel to supplying power to the DC bus.

36. The method of claim 23 further comprising;
supplying power from the N power modules to a DC bus;
supplying power from at least one alternative DC source to the DC bus; and
supplying power to the M charging station from the DC bus.

37. The method of claim 36 wherein the M electric vehicle charging stations are electrically connected to the DC bus via a disconnect module.

38. The method of claim 37 wherein the M electric vehicle charging stations further comprise a charging DC/DC converter for supplying power from the DC bus to a battery of an electric vehicle.

39. The method of claim 37 wherein the M electric vehicle charging stations further comprise at least two charging DC/DC converters electrically connected in series for supplying power from the DC bus to a battery of an electric vehicle.

40. The method of claim 37 wherein the M electric vehicle charging station further comprise at least two charging DC/DC converters electrically connected in parallel for supplying power from the DC bus to a battery of an electric vehicle.

41. The method of claim 37, wherein the M electric vehicle charging stations further comprise one or more battery docking stations configured to receive an electric vehicle battery for charging.

42. The method of claim 37 wherein the M electric vehicle charging stations further comprises a DC/AC inverter electrically connected to the DC bus and configured to supply AC to an electric vehicle for charging a battery of the electric vehicle.

43. The method of claim 37 wherein the M electric vehicle charging station further comprises a bidirectional DC/DC converter electrically connected to the DC bus and configured to supply DC to an electric vehicle for charging a battery of an electric vehicle or to receive power from the battery of the electric vehicle.

44. The system of claim 1, wherein:
the M of the plurality of electric vehicle charging stations are configured to provide the received power from the N of the plurality of power modules to X of the plurality of electric vehicle batteries; and
in a second configuration of the first switching device, the first power module of the N power modules is electrically disconnected from the first electric vehicle charging station of the M electric vehicle charging stations.

45. The method of claim 23, further comprising:
supplying the power from the N power modules to the X electric vehicle batteries via the M electric vehicle charging stations; and
disconnecting the first power module of the N power modules from the first electric vehicle charging station of the M electric vehicle charging stations via the first switching element in a second configuration.

* * * * *